US009652927B2

(12) United States Patent
Sadamoto

(10) Patent No.: US 9,652,927 B2
(45) Date of Patent: May 16, 2017

(54) INFORMATION STORAGE MEDIUM, SERVER, AND REGISTRATION METHOD

(75) Inventor: Kunihiro Sadamoto, Chiba (JP)

(73) Assignee: BANDAI NAMCO GAMES INC., Tokyo (JP)

( * ) Notice: Subject to any disclaimer, the term of this patent is extended or adjusted under 35 U.S.C. 154(b) by 531 days.

(21) Appl. No.: 13/198,953

(22) Filed: Aug. 5, 2011

(65) Prior Publication Data

US 2012/0036189 A1 Feb. 9, 2012

(30) Foreign Application Priority Data

Aug. 9, 2010 (JP) ................................ 2010-178691

(51) Int. Cl.

*A63F 9/24* (2006.01)
*A63F 13/00* (2014.01)
*G06F 17/00* (2006.01)
*G06F 19/00* (2011.01)
*G07F 17/32* (2006.01)

(52) U.S. Cl.

CPC .................................... *G07F 17/32* (2013.01)

(58) Field of Classification Search

CPC .............. A63F 2300/50; A63F 2300/57; A63F 2300/572; A63F 2300/575
USPC ........................................................... 463/30
See application file for complete search history.

(56) References Cited

U.S. PATENT DOCUMENTS

| | | | | |
|---|---|---|---|---|
| 8,088,007 | B2 | 1/2012 | Tabata | |
| 8,490,007 | B1 * | 7/2013 | Hoffman ................ | G06Q 30/00 715/757 |
| 2002/0128066 | A1 | 9/2002 | Namba et al. | |
| 2006/0100006 | A1 * | 5/2006 | Mitchell et al. .................. | 463/9 |
| 2009/0271247 | A1 | 10/2009 | Karelin et al. | |
| 2013/0178258 | A1 * | 7/2013 | Johnson, Jr. ...................... | 463/4 |

FOREIGN PATENT DOCUMENTS

| | | |
|---|---|---|
| JP | A-2002-269287 | 9/2002 |
| JP | B2-3873075 | 1/2007 |
| JP | A-2008-093165 | 4/2008 |
| WO | WO 2008/144412 A2 | 11/2008 |

OTHER PUBLICATIONS

Tsushinsha et al., "Personal Market for Game Items," *Gekkan E. Columbus*, vol. 36, p. 59, Mar. 29, 2010 (with partial translation).

* cited by examiner

*Primary Examiner* — Milap Shah
*Assistant Examiner* — Jason Pinheiro
(74) *Attorney, Agent, or Firm* — Oliff PLC

(57) ABSTRACT

A server notifies another user that a virtual item of the user has been registered when the virtual item of the user has been registered, receives a registration request for the virtual item of the user from the terminal of the other user, and registers the virtual item of the user in association with the identification information of the other user as a virtual item of the other user when the registration request for the virtual item of the user from the terminal of the other user has been received.

17 Claims, 12 Drawing Sheets

FIG.6

LOTTERY

| LOTTERY | REQUIRED LEVEL | LOTTERY TICKET | FILTERING |
|---|---|---|---|
| RANDOM | LV1 | 1 | NONE |
| BIRTHDAY | LV5 | 2 | ONE WEEK AROUND BIRTHDAY |
| TEAM | LV10 | 3 | SELECTED TEAM |
| GOLD | LV20 | 10 | RARITY $\geq 3$ |

FIG.7

| TYPE | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| BEGINNER TABLE 1 | 4 | 4 | 3 | 3 | 3 | 2 | 2 | 2 | 2 | 2 | 1 | 1 | 1 | 1 | 1 | 0 | 0 | 0 | 0 | 0 |
| BEGINNER TABLE 2 | 4 | 3 | 3 | 2 | 2 | 2 | 2 | 2 | 1 | 1 | 1 | 1 | 1 | 1 | 0 | 0 | 0 | 0 | 0 | 0 |
| NORMAL TABLE | 4 | 3 | 2 | 2 | 2 | 2 | 1 | 1 | 1 | 1 | 1 | 1 | 1 | 0 | 0 | 0 | 0 | 0 | 0 | 0 |

RARITY 0: COMMON (C)
RARITY 1: UNCOMMON (UC)
RARITY 2: RARE (R)
RARITY 3: SUPER RARE (SR)
RARITY 4: BEST ELEVEN (B11)

INFORMATION STORAGE MEDIUM, SERVER, AND REGISTRATION METHOD

Japanese Patent Application No. 2010-178691, filed on Aug. 9, 2010, is hereby incorporated by reference in its entirety.

BACKGROUND OF THE INVENTION

The present invention relates to an information storage medium, a server, and a registration method.

A social networking service (SNS) (i.e., network system) that provides the user with a community-type service has been known. Such a network system allows the user to add his (or her) friends to the friend list, and allow the friends to read the diary of the user, or exchange an e-mail with the friends. In recent years, the social networking service provides the user with an application program (e.g., game).

A system that randomly extracts a virtual item (e.g., character information) and provides the virtual item to the user has been known (see JP-A-2008-93165). Such a system may provide a rare virtual item, and provide the user with the rare virtual item with a predetermined probability. However, since the user cannot necessarily acquire the rare virtual item, the user may be discontented (frustrated).

SUMMARY

According to a first aspect of the invention, there is provided a non-transitory computer-readable information storage medium storing a server program, the server program causing a computer to function as:

a communication control section that exchanges data with a plurality of terminals of users via a network;

a calculation section that performs game calculations based on a virtual item in association with identification information of each user;

a lottery processing section that randomly chooses a virtual item from a plurality of virtual items stored in a storage section when a lottery request from a terminal of a user has been received;

a virtual item control section that registers the chosen virtual item in association with the identification information of the user as a virtual item of the user;

a notification control section that notifies another user that the virtual item of the user has been registered when the virtual item of the user has been registered; and a reception section that receives a registration request for the virtual item of the user from the terminal of the other user, the virtual item control section registering the virtual item of the user in association with the identification information of the other user as a virtual item of the other user when the registration request for the virtual item of the user from the terminal of the other user has been received.

According to a second aspect of the invention, there is provided a server including:

a communication control section that exchanges data with a plurality of terminals of users via a network;

a calculation section that performs game calculations based on a virtual item in association with identification information of each user;

a lottery processing section that randomly chooses a virtual item from a plurality of virtual items stored in a storage section when a lottery request from a terminal of a user has been received;

a virtual item control section that registers the chosen virtual item in association with the identification information of the user as a virtual item of the user;

a notification control section that notifies another user that the virtual item of the user has been registered when the virtual item of the user has been registered; and a reception section that receives a registration request for the virtual item of the user from the terminal of the other user, the virtual item control section registering the virtual item of the user in association with the identification information of the other user as a virtual item of the other user when the registration request for the virtual item of the user from the terminal of the other user has been received.

According to a third aspect of the invention, there is provided a registration method that is implemented by a server, and registers a virtual item, the method including:

exchanging data with a plurality of terminals of users via a network; performing game calculations based on a virtual item in association with identification information of each user;

randomly choosing a virtual item from a plurality of virtual items stored in a storage section when a lottery request from a terminal of a user has been received;

registering the chosen virtual item in association with the identification information of the user as a virtual item of the user;

notifying another user that the virtual item of the user has been registered when the virtual item of the user has been registered;

receiving a registration request for the virtual item of the user from the terminal of the other user; and registering the virtual item of the user in association with the identification information of the other user as a virtual item of the other user when the registration request for the virtual item of the user from the terminal of the other user has been received.

BRIEF DESCRIPTION OF THE SEVERAL VIEWS OF THE DRAWING

FIG. 6 illustrates a lottery process according to one embodiment of the invention.

FIG. 7 is a diagram illustrating the relationship between a lottery count and a rarity value according to one embodiment of the invention.

DETAILED DESCRIPTION OF THE EMBODIMENT

Figure 1:
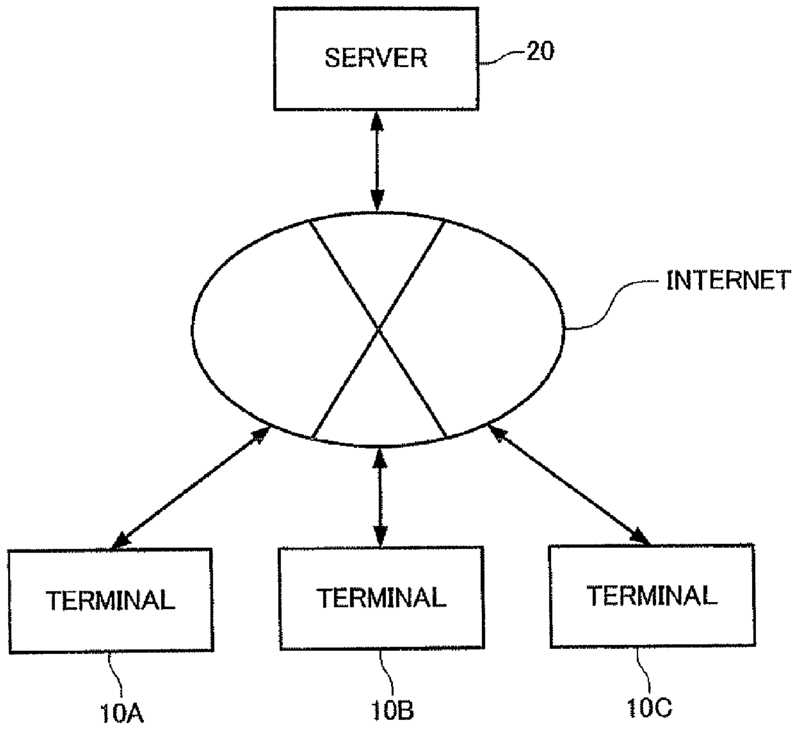
FIG. 1 illustrates an example of a network diagram of a network system according to one embodiment of the invention.

The invention may provide a program, an information storage medium, and a server that allow a user to more reliably acquire a virtual item when a lottery process that randomly chooses a virtual item from a plurality of virtual items is performed.

(1) One embodiment of the invention relates to a non-transitory computer-readable information storage medium storing a server program, the server program causing a computer to function as:

a communication control section that exchanges data with a plurality of terminals of users via a network;

a calculation section that performs game calculations based on a virtual item in association with identification information of each user;

a lottery processing section that randomly chooses a virtual item from a plurality of virtual items stored in a storage section when a lottery request from a terminal of a user has been received;

a virtual item control section that registers the chosen virtual item in association with the identification information of the user as a virtual item of the user;

a notification control section that notifies another user that the virtual item of the user has been registered when the virtual item of the user has been registered; and a reception section that receives a registration request for the virtual item of the user from the terminal of the other user, the virtual item control section registering the virtual item of the user in association with the identification information of the other user as a virtual item of the other user when the registration request for the virtual item of the user from the terminal of the other user has been received.

According to the information storage medium, another user is notified that the virtual item of the user has been registered, and the virtual item of the user is registered as the virtual item of another user when a registration request for the virtual item of the user has been received from the terminal of the other user. Therefore, the other user can more reliably acquire the virtual item even if the lottery process is not performed.

For example, when the virtual item (e.g., item information, game item, virtual player item, virtual team item, player stock, team stock) desired by a user A is not chosen by the lottery process, but has been registered as the virtual item owned by a user B by the lottery process, the user A can acquire (register) the desired virtual item by sending a registration request for the virtual item owned by the user B from the terminal of the user A.

(2) In the information storage medium, the virtual item control section may register the virtual item of the user as the virtual item of the other user when the registration request for the virtual item of the user from the terminal of the other user has been received within a predetermined period after the virtual item of the user has been registered.

According to the above feature, the virtual item of the user is registered as the virtual item of the other user when the registration request has been received within a predetermined period. This makes it possible to prevent a decrease in value of the virtual item due to temporal restriction, and motivate the other user to immediately acquire (register) the virtual item of the user.

(3) In the information storage medium, the virtual item control section may limit the number of other users for whom the virtual item of the user is registered as the virtual item of the other user to a predetermined number.

According to the above feature, since the number of other users for whom the virtual item owned by the user is registered as the virtual item is limited to a predetermined number, it is possible to prevent a decrease in value of the virtual item. Moreover, since the number of other users for whom the virtual item owned by the user is registered as the virtual item is limited, it is possible to motivate another user to immediately send a registration request for the virtual item owned by the user.

(4) In the information storage medium, friend information that specifies another user who maintains a friend relationship with the user may be stored in the storage section, and the virtual item control section registers the virtual item of the user as the virtual item of the other user when a registration request for the virtual item of the user from the terminal of the other user who maintains a friend relationship with the user has been received.

According to the above feature, when a registration request for the virtual item of the user has been received from the terminal of the other user who maintains a friend relationship with the user, the virtual item owned by the user is registered as the virtual item owned by the other user. This makes it possible for users to maintain a close friend relationship. If the user and the other user do not maintain a friend relationship, it is possible to motivate the users to establish a friend relationship.

(5) In the information storage medium, the plurality of virtual items may be stored in the storage section, the each of the plurality of virtual items in association with one of a plurality of rarity values; and the lottery processing section selects one of the plurality of rarity values based on a lottery count of the user, and selects one virtual item from the virtual items with the selected rarity value.

According to the above feature, since one of the plurality of rarity values is selected based on the lottery count of the user, and one virtual item is selected from the virtual items with the selected rarity value, it is possible to implement a lottery process that chooses various virtual items (e.g., rare virtual item or non-rare virtual item).

(6) In the information storage medium, the plurality of virtual items are stored in the storage section, the each of the plurality of virtual items in association with one of a plurality of groups, and the lottery processing section selects one virtual item from the virtual items of one group that has been determined in advance based on information input by the user.

According to the above feature, since one virtual item is selected from the virtual items of one group among the plurality of groups that has been determined in advance, it is possible to choose a virtual item (e.g., virtual player item) from the virtual items of the group (e.g., team or league) desired by the user.

(7) In the information storage medium, the lottery processing section may receive a selection of one lottery process among a plurality of lottery processes that differ from each other in virtual item choosing method from the terminal of the user, and may choose one virtual item from the plurality of virtual items by the selected lottery process.

According to the above feature, since a plurality of lottery processes that differ from each other in virtual item choosing method are provided, the user does not lose interest in the game. Moreover, since the virtual item is chosen by the lottery process selected by the user, the user can acquire the virtual item by the desired lottery process.

(8) In the information storage medium as defined in claim 1, each of the plurality of virtual items may be a virtual player item corresponding to an existing player, and the calculation section may calculate a game parameter of a user based on actual match result information about a player corresponding to the virtual player item registered for the user.

According to the above feature, since the game parameter (e.g., divided points, money) of the user is calculated based the actual match result information about the player, the user can more fully enjoy the actual match. Moreover, since the actual match result information is used in the game, the user can enjoy the game that takes account of the match results in addition to the actual match.

(9) In the information storage medium, the calculation section may change a value of the virtual player item based on the actual match result information about the player.

According to the above feature, since the value of the virtual player item is changed based on the actual match result information about the player, the user can more fully enjoy the actual match and the game.

(10) Another embodiment of the invention relates to a server including:

a communication control section that exchanges data with a plurality of terminals of users via a network;

a calculation section that performs game calculations based on a virtual item in association with identification information of each user;

a lottery processing section that randomly chooses a virtual item from a plurality of virtual items stored in a storage section when a lottery request from a terminal of a user has been received;

a virtual item control section that registers the chosen virtual item in association with the identification information of the user as a virtual item of the user;

a notification control section that notifies another user that the virtual item of the user has been registered when the virtual item of the user has been registered; and a reception section that receives a registration request for the virtual item of the user from the terminal of the other user, the virtual item control section registering the virtual item of the user in association with the identification information of the other user as a virtual item of the other user when the registration request for the virtual item of the user from the terminal of the other user has been received.

(11) Another embodiment of the invention relates to a registration method that is implemented by a server, and registers a virtual item, the method including:

exchanging data with a plurality of terminals of users via a network;

performing game calculations based on a virtual item in association with identification information of each user;

randomly choosing a virtual item from a plurality of virtual items stored in a storage section when a lottery request from a terminal of a user has been received;

registering the chosen virtual item in association with the identification information of the user as a virtual item of the user;

notifying another user that the virtual item of the user has been registered when the virtual item of the user has been registered;

receiving a registration request for the virtual item of the user from the terminal of the other user; and registering the virtual item of the user in association with the identification information of the other user as a virtual item of the other user when the registration request for the virtual item of the user from the terminal of the other user has been received.

Exemplary embodiments of the invention are described below. Note that the following embodiments do not unduly limit the scope of the invention as stated in the claims. Note also that all of the elements described below should not necessarily be taken as essential elements of the invention.

1. Network System

FIG. 1 is a diagram illustrating a network system according to one embodiment of the invention. The network system includes a plurality of terminals 10 and a server 20. As illustrated in FIG. 1, the network system is configured so that the server 20 that provides a service and the terminals 10 can be connected to a network.

The server 20 is an information processing device that allows a plurality of users to communicate. In one embodiment of the invention, the server 20 is a server that provides a community-type service referred to as a social networking service (SNS).

Specifically, the server 20 transmits information (e.g., user name, diary, notice information, and progress of a game) about a user to a user who has logged in and another user who maintains a friend relationship with the user so that the users participate in a community. The server 20 may provide the service to only a user who has registered himself as a member.

For example, the server 20 has a web server function and a mail server function (mail delivery function). The terminal 10 includes a web browser that allows the user to browse a web page (Hyper Text Markup Language (HTML) format data). Specifically, the terminal 10 accesses a URL for the SNS provided by the server 20, and transmits the user name and the password. When the user has successfully logged into the server 20, the server 20 transmits the web page of the user to the terminal 10. The terminal 10 displays the received web page of the user on a display section 190 (web browser).

When the server 20 has received information that indicates that one user and another user request a friend relationship with each other, the server 20 registers identification information about each user so that the identification information is linked to each other.

For example, when the server 20 has received information that indicates that a user A requests a friend relationship with a user B from a terminal 10A, the server 20 transmits the friend request from the user A to a terminal 10B of the user B. When the server 20 has received information that indicates that the user B accepts the friend request from the user A from the terminal 10B, the server 20 determines that the user A and the user B have established a friend relationship. The server 20 then registers the identification information about the user B so that the identification information about the user B is linked to the identification information about the user A, and registers the identification information about the user A so that the identification information about the user A is linked to the identification information about the user B.

The SNS according to one embodiment of the invention allows each user to post notice information. For example, the user A posts the notice information by transmitting the notice information input using the terminal A of the user A to the server 20 from the terminal 10A. The server 20 transmits data (web page) including the notice information posted by the user A to the terminal 10A so that the terminal 10A can display the notice information on the display section.

The server 20 allows the user B who is registered in a friend list to view the notice information from the terminal A of the user A. For example, the user B can view the notice information posted by the user A, and comment on or evaluate (e.g., "Great!") the notice information posted by the user A.

The server 20 may allow only a limited user to view user information (e.g., notice information and game situation) about each user based on viewing restriction information (browse restriction information) about each user. For example, when the user A allows only his friends to view the user information, the server 20 allows only users (e.g., users B, C, D, and E) who maintain a friend relationship with the user A to view the notice information posted by the user A, and does not allow a user (e.g., user F) who does not maintain a friend relationship with the user A to view the notice information posted by the user. Note that the viewing restriction information indicates "ALL USERS", "ONLY FRIENDS", "FRIENDS OF FRIENDS", and the like. The server 20 receives a permission select request from the terminal of the user, and sets the viewing restriction information about the user.

The server 20 included in the network system according to one embodiment of the invention provides an online game service upon receiving a request from the terminal 10. Specifically, the terminal 10 transmits input information input by the user using the terminal 10 to the server 20 via the network, and the server 20 performs a game calculation process based on the received input information. The server 20 transmits the game calculation results to the terminal 10 via the network, and the terminal 10 displays the received game calculation results on the display section 190.

The terminal 10 is an information processing device such as a portable terminal (e.g., mobile phone, PHS terminal, smartphone, PDA, or portable game machine), a personal computer (PC), a game device, or an image generation device, and can connect to the server 20 via a network (e.g., Internet (WAN) and LAN). The terminal 10 and the server 20 may be connected via a cable communication channel or a wireless communication channel.

2. Configuration

2-1. Configuration of Terminal

Figure 2:
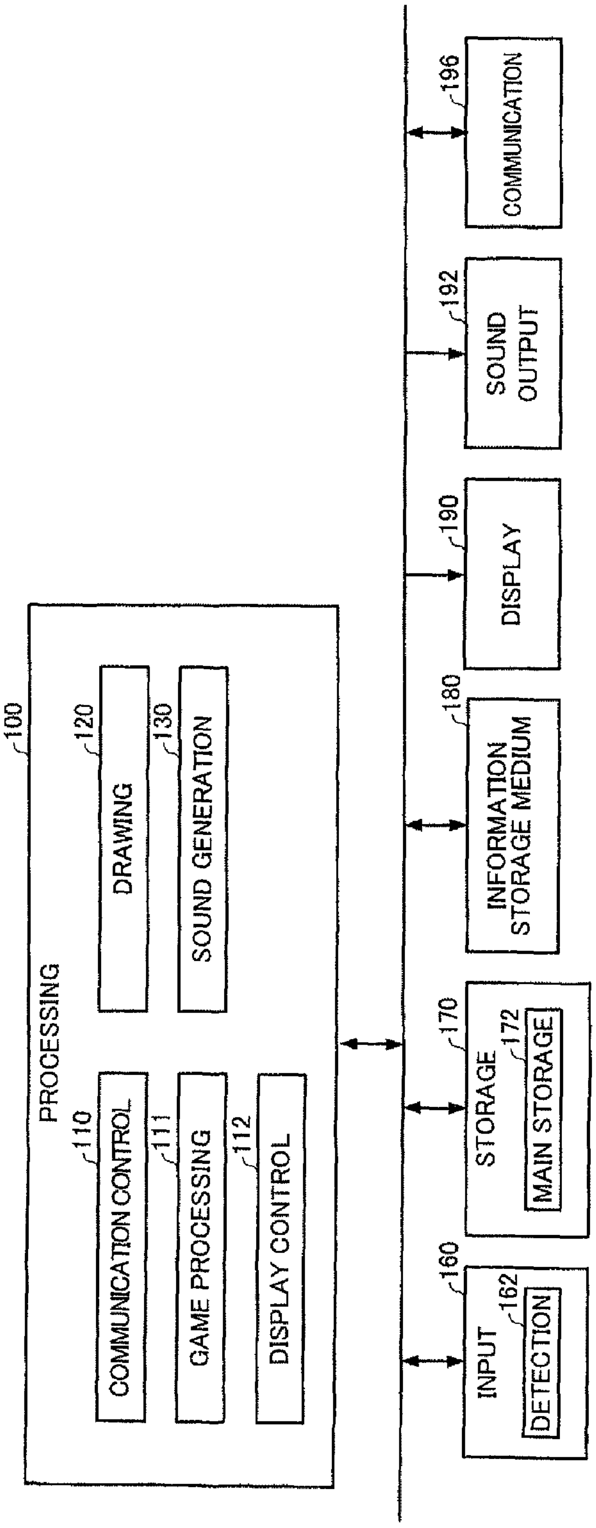
FIG. 2 is a functional block diagram of a terminal according to one embodiment of the invention.

FIG. 2 illustrates an example of a functional block diagram of the terminal according to one embodiment of the invention. Note that the terminal may have a configuration in which some of the elements (sections) illustrated in FIG. 2 are omitted.

An input section 160 allows the user to input information, and outputs the information input by the user to a processing section. The input section 160 includes a detection section 162 that detects the information (input signal) input by the user. The input section 160 may include a lever, a button, a steering wheel, a microphone, a touch panel display, a keyboard, a mouse, and the like.

The input section 160 may be an input device that includes an acceleration sensor that detects three-axis accelerations, a gyrosensor that detects angular velocity, and an imaging section. For example, the input device may be a device that is held or worn by the user. The term "input device" includes a controller that imitates a tool such as a sword-type controller or a gun-type controller that is held by the user, or a glove-type controller that is worn by the user. The term "input device" also includes a game device, a portable game device, a mobile phone, and the like that are integrated with the input device. The terminal according to one embodiment of the invention may include a plurality of input sections 160.

A storage section 170 serves as a work area for a processing section 100, a communication section 196, and the like. The function of the storage section 170 may be implemented by a RAM (VRAM) or the like.

An information storage medium 180 (computer-readable medium) stores a program, data, and the like. The function of the information storage medium 180 may be implemented by an optical disk (CD or DVD), a magneto-optical disk (MO), a magnetic disk, a hard disk, a magnetic tape, a memory (ROM), or the like. The processing section 100 performs various processes according to one embodiment of the invention based on a program (data) stored in the information storage medium 180. A program that causes a computer to function as each section according to one embodiment of the invention (i.e., a program that causes a computer to execute the process of each section) may be stored in the information storage medium 180.

The terminal receives game data and a program that causes a computer to function as each section according to one embodiment of the invention that are stored in an information storage medium 280 or a storage section 270 included in the server 20 via a network, and stores the received program and data in the information storage medium 180. The terminal may store the program and the data received from the server 20 in the storage section 170. A case where the terminal (network system) operates based on a program and data received from the server 20 is also included within the scope of the invention.

The display section 190 outputs an image generated according to one embodiment of the invention. The function of the display section 190 may be implemented by a CRT, an LCD, a touch panel display, a head mount display (HMD), or the like. A sound output section 192 outputs sound generated according to one embodiment of the invention. The function of the sound output section 192 may be implemented by a speaker, a headphone, or the like.

The communication section 196 controls communication with the outside (e.g., another terminal or server). The function of the communication section 196 may be implemented by hardware such as a processor or a communication ASIC, a program, or the like.

The processing section 100 (processor) performs a game process, an image generation process, a sound generation process, and the like based on information input from the input section 160, a program, and the like.

The processing section 100 performs various processes using a main storage section 172 of the storage section 170 as a work area. The function of the processing section 100 may be implemented by hardware such as a processor (e.g., CPU or DSP) or an ASIC (e.g., gate array), or a program.

The processing section 100 includes a communication control section 110, a game processing section 111, a display control section 112, a drawing section 120, and a sound generation section 130. Note that the processing section 100 may have a configuration in which some of these sections are omitted.

The communication control section 110 exchanges data with the server 20. For example, the communication control section 110 designates the IP address and the port number of the server, and exchanges data with the server 20. The communication control section 110 stores data received from the server 20 in the storage section 170, analyzes the received data, and performs a data transmission/reception control process, for example. The communication control section 110 may store destination information (IP address and port number) about the server in the information storage medium 180, and manage the destination information. The communication control section 110 may communicate with the server 20 when the communication control section 110 has received communication start input information from the user.

The communication control section 110 transmits the identification information about the user to the server 20, and receives data (web page of the user) about the user information from the server 20. For example, the communication control section 110 receives data including information (e.g., user name and notice information) about another user who maintains a friend relationship with the user from the server 20.

The communication control section 110 may generate a packet including data at the image drawing frame rate, and transmit the generated packet to the server 20. For example, when the frame rate is 60 fps, the communication control section 110 may transmits the packet to the server 20 every 1⁄60th of a second.

The game processing section 111 performs various game calculation processes. For example, the game processing section 111 starts the game when game start conditions have been satisfied, proceeds with the game, and finishes the game when game finish conditions have been satisfied.

The game processing section 111 may dispose an object (i.e., an object formed by a primitive such as a polygon, a free-form surface, or a subdivision surface) that represents a display object (e.g., player character, building, stadium, car, tree, pillar, wall, or map (topography) in an object space.

The term "object space" refers to a virtual space, and includes a two-dimensional space and a three-dimensional space. The term "two-dimensional space" refers to a space in which the object is disposed at two-dimensional coordinates (X, Y), and the term "three-dimensional space" refers to a space in which the object is disposed at three-dimensional coordinates (X, Y, Z), for example. When the object space is a three-dimensional space, for example, the game processing section 111 disposes the object in a world coordinate system. For example, the game processing section 111 determines the position and the rotational angle of the object in the world coordinate system (the rotational angle is synonymous with orientation or direction; e.g., the rotational angle when the object is rotated clockwise around each of the X, Y, and Z axes in the world coordinate system), and disposes the object at the determined position (X, Y, Z) and the determined rotational angle (rotational angles around the X, Y, and Z axes).

The game processing section 111 may move the player character in the object space. Specifically, the game processing section 111 may cause the player character to move or make a motion (animation) in the object space based on the input information input by the player using the input section 160, a program (movement/motion algorithm), data (motion data), and the like. More specifically, the game processing section 111 may sequentially calculate movement information (movement parameters such as the position, rotation angle, speed, and acceleration) and motion information (position or rotation angle of each part that forms the object) about the player character every frame (e.g., 1⁄60th of a second). Note that the term "frame" refers to a time unit employed when performing the player character movement/motion process or the image generation process.

The display control section 112 displays data (e.g., web data and HTML format data) received from the server 20 on the display section 190 using a browser or the like. The display control section 112 may display the game process performed by the game processing section 111, or may display an image generated by the drawing section 120 on the display section 190.

The drawing section 120 performs a drawing process based on the results of various processes (e.g., game process) performed by the processing section 100 to generate an image, and outputs the generated image to the display section 190. The drawing section 120 may generate a two-dimensional image or a three-dimensional image.

When the drawing section 120 generates a two-dimensional image, the drawing section 120 generates an image viewed sideways. For example, the drawing section 120 sets a priority to each object (sprite), and sequentially draws the objects in ascending of the priority. When the objects overlap, the drawing section 120 draws the object with a higher priority over the object with a lower priority.

When generating a three-dimensional game image, the drawing section 120 receives object data (model data) including vertex data (e.g., vertex position coordinates, texture coordinates, color data, normal vector, or alpha value) of each vertex of the object (model), and performs a vertex process (shading using a vertex shader) based on the vertex data included in the received object data. When performing the vertex process, the drawing section 120 may optionally perform a vertex generation process (tessellation, surface division, or polygon division) for dividing the polygon.

In the vertex process, the drawing section 120 performs a vertex movement process and a geometric process such as coordinate transformation (world coordinate transformation or camera coordinate transformation), clipping, or perspective transformation based on a vertex processing program (vertex shader program or first shader program), and changes (updates or adjusts) the vertex data of each vertex that forms the object based on the processing results.

The drawing section 120 then performs a rasterization process (scan conversion) based on the vertex data changed by the vertex process so that the surface of the polygon (primitive) is linked to pixels. Next, the drawing section 120 performs a pixel process (shading using a pixel shader or a fragment process) that draws the pixels that form the image (fragments that form the display screen). In the pixel process, the drawing section 120 determines the drawing color of each pixel that forms the image by performing various processes such as a texture reading (texture mapping) process, a color data setting/change process, a translucent blending process, and an anti-aliasing process based on a pixel processing program (pixel shader program or second shader program), and outputs (draws) the drawing color of the object subjected to perspective transformation to a drawing buffer (i.e., a buffer that can store image information corresponding to each pixel; VRAM or rendering target). Specifically, the pixel process includes a per-pixel process that sets or changes the image information (e.g., color, normal, luminance, and alpha-value) corresponding to each pixel. The drawing section 120 thus generates an image viewed from a virtual camera (viewpoint) in the object space. When a plurality of virtual cameras (viewpoints) are provided, the drawing section 120 may generate an image so that images (divided images) viewed from the respective virtual cameras are displayed on one screen.

The drawing section 120 controls the virtual camera (viewpoint) for generating an image viewed from a given (arbitrary) viewpoint in the object space. Specifically, the drawing section 120 controls the position (X, Y, Z) or the rotational angle (e.g., the rotational angle of the virtual camera when the virtual camera is rotated clockwise around each of the X, Y, and Z axes) of the virtual camera in the world coordinate system when generating a three-dimensional image. Specifically, the drawing section 120 controls the viewpoint position, the line-of-sight direction, and the angle of view of the virtual camera. The drawing section 120 may rotate the virtual camera by a given rotation angle. In this case, the drawing section 120 controls the virtual camera based on virtual camera data that specifies the position or the rotational angle of the virtual camera. When a plurality of virtual cameras (viewpoints) are provided, the drawing section 120 performs the above control process on each virtual camera.

For example, when photographing the object (e.g., player character) from behind using the virtual camera, the drawing section 120 controls the position or the direction of the virtual camera so that the virtual camera follows a change in the position or the direction of the object. In this case, the drawing section 120 may control the virtual camera based on information about the position, direction, speed, and the like of the object obtained by the movement/motion processing section 112. Alternatively, the drawing section 120 may set the virtual camera in a predetermined direction, or may move the virtual camera along a predetermined path. In this case, the drawing section 120 controls the virtual camera based on virtual camera data that specifies the position (moving path) or the direction of the virtual camera. When a plurality of virtual cameras (viewpoints) are provided, the drawing section 120 performs the above control process on each virtual camera.

The vertex process and the pixel process are implemented by hardware that enables a programmable polygon (primitive) drawing process (i.e., a programmable shader (vertex shader and pixel shader)) based on a shader program written in shading language. The programmable shader enables a programmable per-vertex process and a per-pixel process, and increases the degree of freedom of the drawing process so that the representation capability can be significantly improved as compared with a fixed drawing process using hardware.

The drawing section 120 performs a geometric process, texture mapping, hidden surface removal, alpha-blending, and the like when drawing the object.

In the geometric process, the drawing section 120 subjects the object to coordinate transformation, clipping, perspective projection transformation, light source calculations, and the like. The object data (e.g., vertex position coordinates, texture coordinates, color data (luminance data), normal vector, or alpha-value) subjected to the geometric process (perspective transformation) is stored in an object data storage section.

The term "texture mapping" refers to a process that maps a texture (texel value) stored in a texture storage section of the storage section 170 onto the object. Specifically, the drawing section 120 reads a texture (surface properties such as color (RGB) and alpha value) from the texture storage section of the storage section 170 using the texture coordinates set (assigned) to the vertices of the object and the like. The drawing section 120 maps the texture (two-dimensional image) onto the object. In this case, the drawing section 120 performs a pixel-texel link process, a bilinear interpolation process (texel interpolation process), and the like.

The drawing section 120 may perform a hidden surface removal process by a Z-buffer method (depth comparison method or Z-test) using a Z-buffer (depth buffer) that stores the Z-value (depth information) of the drawing pixel. Specifically, the drawing section 120 refers to the Z-value stored in the Z-buffer when drawing the drawing pixel corresponding to the primitive of the object. The drawing section 120 compares the Z-value stored in the Z-buffer with the Z-value of the drawing pixel of the primitive. When the Z-value of the drawing pixel is the Z-value in front of the virtual camera (e.g., a small Z-value), the drawing section 120 draws the drawing pixel and updates the Z-value stored in the Z-buffer with a new Z-value.

The term "alpha-blending" refers to a translucent blending process (e.g., normal alpha-blending, additive alpha-blending, or subtractive alpha-blending) based on the alpha-value (A-value).

Note that the alpha-value is information that can be stored corresponding to each pixel (texel or dot), such as additional information other than the color information. The alpha-value may be used as mask information, translucency (equivalent to transparency or opacity), bump information, or the like.

The sound generation section 130 performs a sound generation process based on the results of various processes performed by the processing section 100 to generate game sound such as background music (BGM), effect sound, or voice, and outputs the generated game sound to the sound output section 192. For example, the sound generation section 130 may output sound data received from the server 20 to the sound output section 192.

2-2. Configuration of Server

Figure 3:
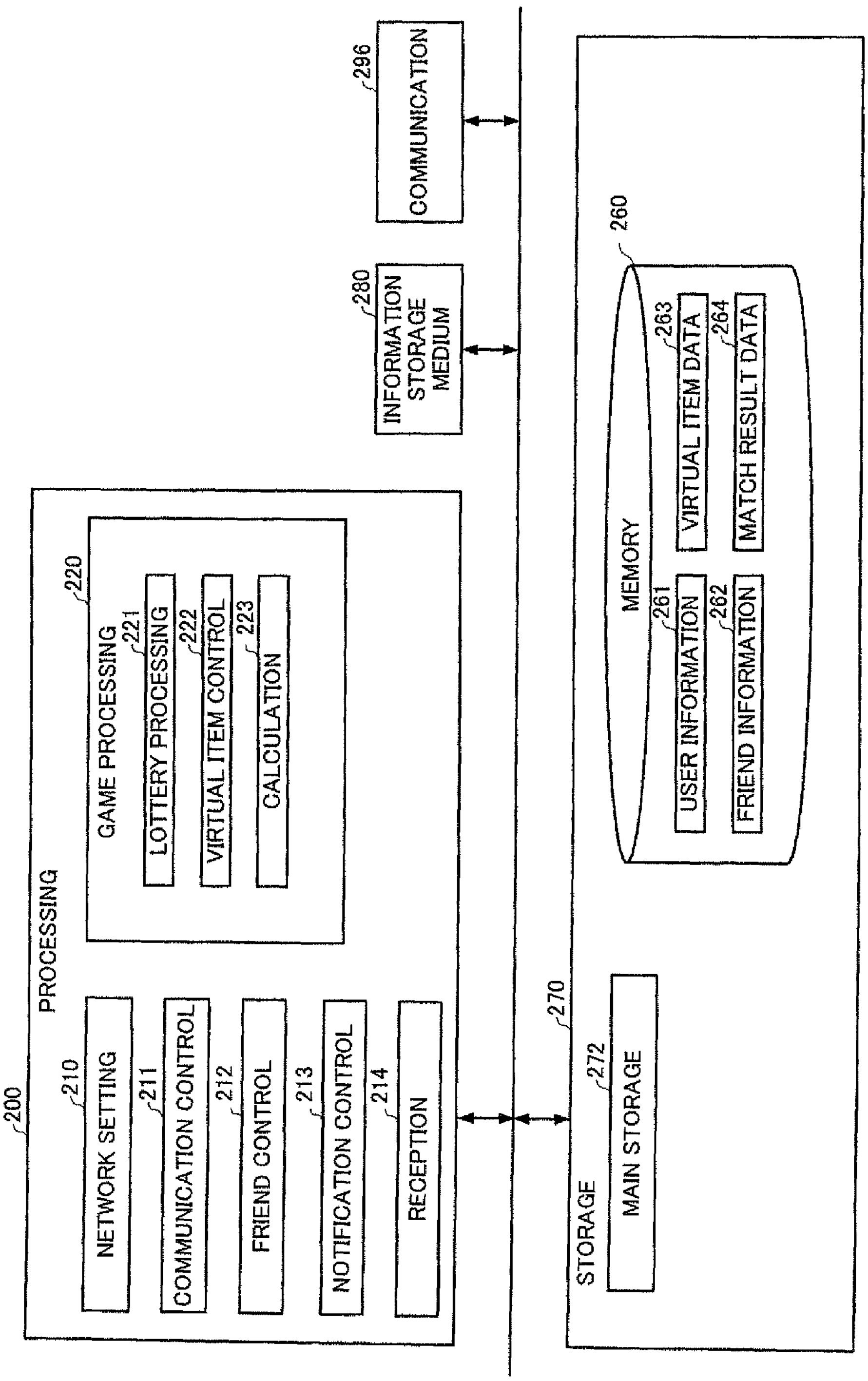
FIG. 3 is a functional block diagram of a server according to one embodiment of the invention.

FIG. 3 illustrates an example of a functional block diagram of the server 20 according to one embodiment of the invention. Note that the server 20 may have a configuration in which some of the elements (sections) illustrated in FIG. 3 are omitted.

A storage section 270 serves as a work area for a processing section 200, a communication section 296, and the like. The function of the storage section 270 may be implemented by a RAM (VRAM) or the like. The storage section 270 includes a memory section 260 (e.g., database).

The memory section 260 stores user information 261 about each user who participates in the network system according to one embodiment of the invention. For example, the memory section 260 stores identification information (user identification number) about each user, a user name (user account), a user password, and the like as the user information 261. Note that the memory section 260 may store destination information (e.g., IP address, e-mail address, port number, MAC address, or telephone number) about the terminal 10, and terminal identification information about the terminal 10 used to access the terminal 10 used by the user, as the user information 261.

The memory section 260 also stores the notice information posted by the user, and a virtual item (item information or game item) registered corresponding to the identification information about the user, as the user information 261 about the user.

The storage section 270 (memory section 260) stores information that specifies another user who maintains a friend relationship with the user as friend information 262. Specifically, the identification information about one or more users who maintain a friendship with the user is linked to the identification information about the user.

The storage section 270 (memory section 260) stores a plurality of virtual items as virtual item data 263. For example, the virtual item may be a virtual team item (team stock) corresponding to an existing team, a virtual player item (player stock) corresponding to an existing player, or the like.

The server 20 stores each virtual item (e.g., player stock) in the storage section 270 (memory section 260) so that one of a plurality of rarity values (0, 1, 2, 3, and 4) is linked to each virtual item. (In short, the server 20 stores each virtual item in the storage section 270, the each of the plurality of virtual items in association with one of a plurality of rarity values.)

The server 20 stores each virtual item in the storage section 270 (memory section 260) so that one of a plurality of groups is linked to each virtual item. (In short, the server 20 stores each virtual item in the storage section 270, the each of the plurality of virtual items in association with one of a plurality of group.) For example, the server 20 stores each virtual item in the storage section 270 so that the team of each player corresponding to each player stock is linked to each virtual item. The server 20 may store each virtual item in the storage section 270 so that the league of each player corresponding to each player stock is linked to each virtual item.

An information storage medium 280 (computer-readable medium) stores a program, data, and the like. The function of the information storage medium 280 may be implemented by an optical disk (CD or DVD), a magneto-optical disk (MO), a magnetic disk, a hard disk, a magnetic tape, a memory (ROM), or the like. The processing section 200 performs various processes according to one embodiment of the invention based on a program (data) stored in the information storage medium 280. Specifically, a program that causes a computer to function as each section according to one embodiment of the invention (i.e., a program that causes a computer to execute the process of each section) is stored in the information storage medium 280.

The communication section 296 performs a control process for communicating with the outside (e.g., terminal, another server, or another network system). The function of the communication section 296 may be implemented by hardware such as a processor or a communication ASIC, a program, or the like.

The processing section 200 (processor) performs a process based on a program stored in the information storage medium 280, and the like. Specifically, the processing section 200 provides a service in response to a request from the terminal.

The processing section 200 performs various processes using a main storage section 272 included in the storage section 270 as a work area. The function of the processing section 200 may be implemented by hardware such as a processor (e.g., CPU or DSP) or an ASIC (e.g., gate array), or a program.

The processing section 200 included in the server 20 includes a network setting section 210, a communication control section 211, a friend control section 212, a notification control section 213, a reception section 214, and a game processing section 220. Note that the processing section 200 may have a configuration in which some of these sections are omitted.

The network setting section 210 receives terminal (e.g., portable terminal) identification information from the terminal 10, and stores network information about the user in the database 260 so that the network information is linked to the received terminal identification information.

The communication control section 211 exchanges data with the terminal 10 via a network. Specifically, the communication control section 211 transmits information about the user to the terminal 10 based on a request from the terminal of the user. The communication control section 211 also transmits information about another user linked to the user to the terminal 10 of the user.

The friend control section 212 registers a plurality of users as maintaining a friend relationship, or cancels the friend relationship between a plurality of users who have been registered as maintaining a friend relationship.

For example, the friend control section 212 links the identification information about a first user to the identification information about a second user, and links the identification information about the second user to the identification information about the first user based on a registration request from the terminal of the first user that requests registration of the second user as a friend, and a registration request from the terminal of the second user that requests registration of the first user as a friend.

The friend control section 212 cancels the friend relationship between a plurality of users who have been registered as maintaining a friend relationship when one of the plurality of users has requested cancellation of the friend relationship.

The notification control section 213 notifies another user that the virtual item owned by the user has been registered when the virtual item owned by the user has been registered. (In short, the notification control section 213 notifies another user that the virtual item of the user has been registered when the virtual item of the user has been registered.) For example, when the virtual item of a user A has been registered, the notification control section 213 notifies a user B that the virtual item owned by the user A has been registered by adding information that indicates that the virtual item owned by the user A has been registered to information (web information) provided by the server when accessed from the terminal of the user B. The notification control section 213 may notify another user that the virtual item owned by the user has been registered by a web server process using the HTTP protocol, or may notify another user that the virtual item owned by the user has been registered by an e-mail delivery process using the SMTP protocol. The notification control section 213 may notify another user that the virtual item owned by the user has been registered via FAX, telephone, or the like.

The reception section 214 receives a request from each terminal. For example, the reception section 214 receives a registration request for the virtual item owned by the user from the terminal of another user. (In short, the reception section 214 receives a registration request for the virtual item of the user from the terminal of the other user.) For example, the reception section 214 has received a registration request for the virtual item owned by the user from the terminal of another user via the communication control section 211.

When the server 20 has received a game program (game application) execution request from the terminal 10, the game processing section 220 executes the game program. The following description is given on the assumption that the server 20 performs various processes (e.g., lottery process, virtual item control process, and calculation process) performed by the game processing section 220. Note that some or all of the processes performed by the game processing section 220 may be performed by the terminal 10. In this case, the server 20 transmits a program executed by the game processing section 220 to the terminal 10.

The game processing section 220 includes a lottery processing section 221, a virtual item control section 222, and a calculation section 223.

The lottery processing section 221 randomly chooses a virtual item from a plurality of virtual items stored in the storage section 270 when a lottery request has been received from the terminal of the user. The lottery processing section 221 chooses a virtual item based on a random function (random program).

The lottery processing section 221 may select one of the rarity values based on the lottery count of the user when a lottery request has been received from the terminal of the user, and may (randomly) select one virtual item from a plurality of virtual items with the selected rarity value. For example, a lottery count of 20 may be set to be one cycle, and the rarity value may be decreased as the lottery count increases within one cycle.

The lottery processing section 221 may select one virtual item from a plurality of virtual items of a group determined in advance based on information input by the user when a lottery request has been received from the terminal of the user. For example, the server 20 determines the favorite team of the user in advance, and (randomly) chooses a virtual player item from a plurality of virtual player items of the favorite team of the user.

The lottery processing section 221 may receive a request that selects one lottery process among a plurality of lottery processes that differ in virtual item choosing method from the terminal of the user, and may choose one virtual item from a plurality of virtual items by the selected lottery process.

The virtual item control section 222 registers the virtual item randomly chosen by the lottery processing section 221 as the virtual item owned by the user so that the virtual item is linked to the identification information about the user. (In short, the virtual item control section 222 registers the chosen virtual item in association with the identification information of the user as a virtual item of the user.) For example, when a lottery request has been received from the terminal of the user A, and the lottery processing section 221 has chosen a virtual player item 1, the virtual item control section 222 registers the virtual player item 1 as the virtual item owned by the user A so that the virtual player item 1 is linked to the identification information about the user A. When a deletion request for the virtual player item 1 owned by the user A has been received, the virtual item control section 222 deletes the virtual player item 1 from the virtual item owned by the user A.

When a registration request for the virtual item owned by the user that has been chosen by the lottery process has been received from the terminal of another user, the virtual item control section 222 may register the virtual item owned by the user as the virtual item owned by the other user so that the virtual item is linked to the identification information about the other user. (In short, when the registration request for the virtual item of the user from the terminal of the other user has been received, the virtual item control section 222 registers the virtual item of the user in association with the identification information of the other user as a virtual item of the other user.) For example, when a registration request for the virtual player item 1 owned by the user A has been received from the terminal of the user B, the virtual item control section 222 may register the virtual player item 1 owned by the user A as the virtual item owned by the user B so that the virtual player item 1 is linked to the identification information about the user B. Specifically, when a registration request has been received from the terminal of the user B, the virtual item control section 222 may register the virtual player item 1 as the virtual item owned by the user 13 in addition to the virtual item owned by the user A.

When a registration request for the virtual item owned by the user has been received from the terminal of another user within a predetermined period after the virtual item owned by the user has been registered, the virtual item control section 222 may register the virtual item owned by the user as the virtual item owned by the other user. (In short, when a registration request has been received within a predetermined period after the virtual item of the user has been registered, the virtual item control section 222 registers the virtual item of the user as the virtual item of the other user) For example, when a registration request for the virtual player item 1 owned by the user A has been received from the terminal of the user B within 24 hours after registration of the virtual player item 1 owned by the user A, the virtual item control section 222 may register the virtual player item 1 as the virtual item owned by the user B so that the virtual player item 1 is linked to the identification information about the user B.

The virtual item control section 222 may limit the number of other users for whom the virtual item owned by the user is registered as the virtual item of the other user to a predetermined number. For example, suppose that the predetermined number is "3", the virtual player item 1 has been registered as being owned by the user A, and a registration request has been received from the terminals of the users B, C, and D. In this case, when the virtual player item 1 has been registered as the virtual item of each user (B, C, and D) so that the virtual player item 1 is linked to the identification information about each user (B, C, and D), and a registration request (fourth registration request) for the virtual player item 1 has been received from the terminal of a user E, the virtual player item 1 chosen by the lottery process and registered as the virtual item owned by the user A is not registered as the virtual item owned by the user E.

When a registration request for the virtual item owned by the user has been received from the terminal of another user who maintains a friend relationship with the user, the virtual item control section 222 may register the virtual item owned by the user as the virtual item owned by the other user.

The calculation section 223 calculates the game parameter of the user based on actual match result information about a team corresponding to a virtual team item registered for the user. The calculation section 223 may change the value of the virtual team item based on the match result information about the team. For example, the calculation section 223 increases the value of the virtual team item when the team has won, and decreases the value of the virtual team item when the team has lost.

The calculation section 223 calculates the game parameter of the user based on actual match result information about a player corresponding to a virtual player item registered for the user. The calculation section 223 may change the value of the virtual player item based on the actual match result information about the player. For example, the calculation section 223 increases the value of the virtual player item when the player has scored, or when the playing time has increased. The calculation section 223 decreases the value of the virtual player item when the player has received a caution, or has been sent off.

3. Game Process

3-1. Outline

The network system according to one embodiment of the invention provides a game that simulates asset management using an existing soccer team or an existing soccer player as a stock. For example, the user (player) plays the game as the president of an investment company that invests in a stock traded on a (fictitious) soccer stock exchange, and aims at expanding the company by acquiring virtual dividend points (i.e., game parameter) higher than that of an investment company of another user.

The user acquires a team stock of an existing soccer team and a player stock of an existing soccer player, and dividend points are calculated based on the actual match results corresponding to the team stock and the player stock owned (acquired) by the user.

The amount of money M (assets) owned by the user in the game increases as the dividend points acquired by the user increase. The user can buy a team stock and a player stock with the money M, and can acquire the money M by selling the team stock and the player stock owned by the user. The user plays the game by buying or selling the team stock and the player stock so that his assets increase under conditions where the actual match results and the like are reflected in the dividend points.

Since the server 20 according to one embodiment of the invention provides the SNS, users who maintain a friend relationship can enjoy the game while referring to the dividend points, the player stock, and the team stock (i.e., virtual item) owned by the other user, for example. The game process according to one embodiment of the invention is described in detail below.

3-2. Dividend Point Calculation Process 3-2-1. Match Result Data

In one embodiment of the invention, match result data 264 about the actual soccer match in a soccer league is stored in the memory section 260. Specifically, when teams T1 and T2 have played a match, and the match has ended, the match result data 264 about the teams T1 and T2 is stored in the memory section 260. Note that the match result data 264 may be received from an external terminal (server) or the like.

The match result data 264 includes items "score", "points (win: 3, loss: 0, draw: 1)", "caution count", "sent-off count", and "number of visitors" of each team, and items "score", "playing time", "presence or absence of loss", "caution count", "sent-off count", and "position (e.g., FW or MF)" of each player of each team, and the like. For example, the match result data 264 may be stored in the memory section 260 on a daily, weekly, monthly, and yearly basis.

3-2-2. Dividend Point Process

The dividend points, the money M, and a lottery ticket of each user are calculated as the game parameters. The lottery ticket is used for a lottery process. In one embodiment of the invention, the user can obtain one lottery ticket per day. The user obtains the lottery ticket based on the dividend points. The user obtains a predetermined number of lottery tickets when the user has invited his friend to the game.

In one embodiment of the invention, a team stock that corresponds to an existing team is used as the virtual item. Therefore, the dividend points, the money M, and the lottery ticket of each user are calculated based on the actual match result information about the team corresponding to the team stock owned (registered) by the user. For example, the price (value) of the team stock changes based on the actual match result information about the team.

In one embodiment of the invention, a player stock that corresponds to an existing player is also used as the virtual item. Therefore, the dividend points, the money M, and the lottery ticket of each user are calculated based on the actual match result information about the player corresponding to the player stock owned (registered) by the user. For example, the price (value) of the player stock changes based on the actual match result information about the player.

In one embodiment of the invention, the dividend points are calculated on a match basis. For example, when teams T1 and T2 play a match, the dividend points are calculated based on the stocks of the teams T1 and T2 owned (registered) by the user and the stocks of the players of the teams T1 and T2 owned (registered) by the user. When the dividend points on a match basis are equal to or greater than a predetermined value, a predetermined bonus value (3000) is added to the money M owned by the user as a bonus, and the user obtains one lottery ticket. The bonus may be increased as the dividend points on a match basis increase. For example, the bonus value added to the money M owned by the user may be increased as the dividend points increase. The number of lottery tickets obtained by the user may be increased as the dividend points increase.

The server 20 calculates the dividend points using the following expression (1) based on the team stock and the player stock owned by each user.

$$\begin{aligned}\text{Dividend points} = {} & (\text{dividend points of team stock of home team}) + \\ & (\text{dividend points of team stock of away team}) + \\ & (\text{dividend points of player stock of player belonging to home team}) + \\ & (\text{dividend points of player stock of player belonging to away team})\end{aligned} \quad (1)$$

The dividend points of the team stock are calculated by the following expression (2).

$$\begin{aligned}\text{Dividend points of team stock} = {} & (\text{score}) \times 25 + (\text{points}) \times 50 + (\text{caution count}) \times (-10) + \\ & (\text{sent-off count}) \times (-25) + (\text{number of visitors}) \times 0.001 + \\ & (25 \text{ when the score is 3 or more}) + \\ & (25 \text{ when the team did not concede a goal})\end{aligned} \quad (2)$$

Specifically, the dividend points of the team stock change based on a win, the caution count, and the like of the team corresponding to the team stock owned by the user. The user can obtain more dividend points when the user owns the stock of a strong team among a plurality of teams.

The dividend points of the player stock is calculated by the following expression (3). Note that the POS correction coefficient is determined in advance based on the position of the player. For example, the POS correction coefficient is determined in advance so that FW=0.5, MF=0.5, DF=0.5, GK=1.0, and the like. Note that the POS correction coefficient of an identical position may be changed based on the score, the playing time, the caution count, the sent-off count, and the presence or absence of loss.

$$\begin{aligned}\text{Dividend points of player stock} = {} & (\text{score}) \times 100 \times (POS \text{ correction coefficient}) + \\ & 100 \times (\text{playing time}/90) \times (POS \text{ correction coefficient}) + \\ & (\text{caution count}) \times (-30) \times (POS \text{ correction coefficient}) +\end{aligned} \quad (3)$$

-continued $$(\text{sent-off count})\times(-100)\times(POS\ \text{correction coefficient})+$$
$$(100\times(\text{playing time}/90)\times(POS\ \text{correction coefficient})$$
$$\text{when the player did not concede a goal})$$

Specifically, the dividend points of the player stock change based on the degree of activity (e.g., long playing time) of the player corresponding to the player stock owned by the user. The user can obtain more dividend points when the player corresponding to the player stock owned by the user played actively.

Note that the server 20 starts the dividend point calculation process when a predetermined period has elapsed after the match has ended, and calculates the total dividend points of the stocks owned by the user. Therefore, since a given time (e.g., 3 minutes) is provided before the server 20 starts the dividend point calculation process after the match has ended, the user can buy a team stock and a player stock immediately after the match has ended (i.e., the user can effectively determine the stock buying timing).

3-2-3. Information Displayed on Terminal

Figure 4:
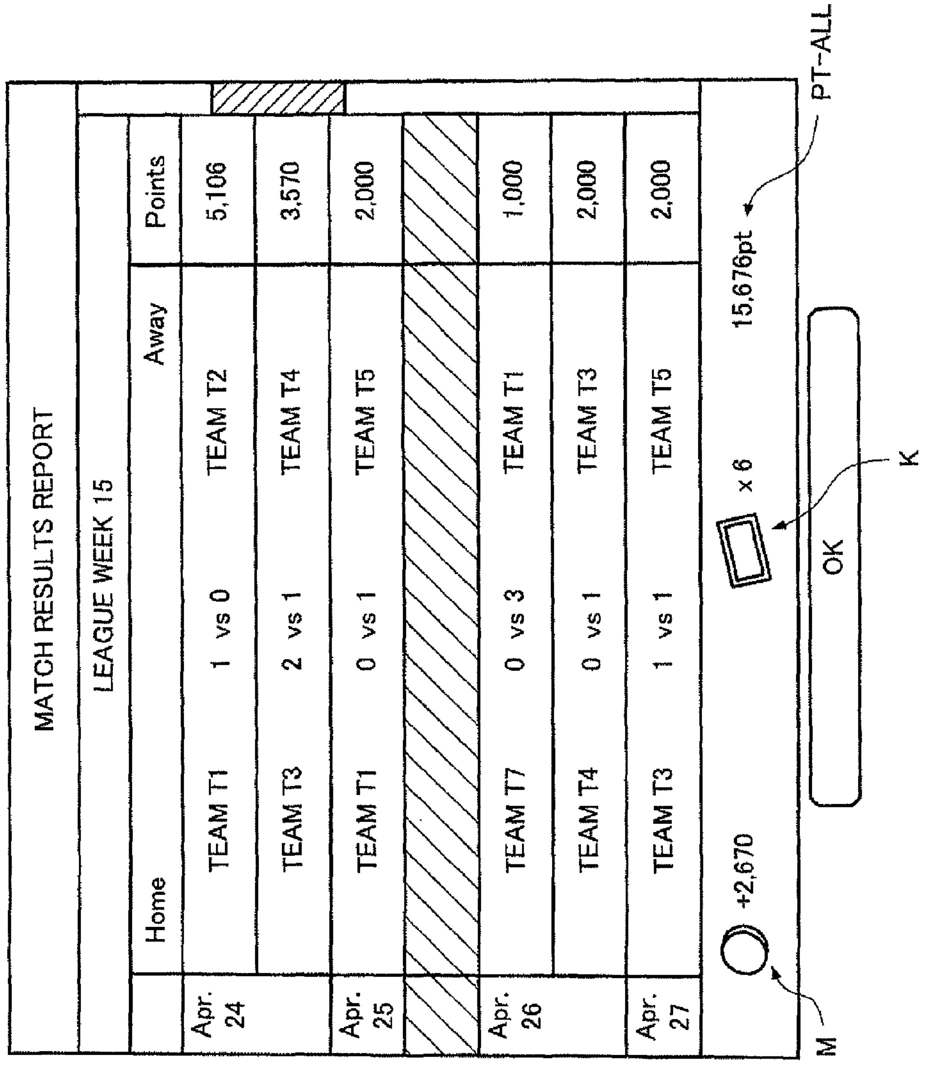
FIG. 4 illustrates an example of data (screen) displayed on a terminal according to one embodiment of the invention.

FIG. 4 illustrates an example of data (image) displayed on the display section 190 of the terminal 10A of the user A. The match results of the team corresponding to the team stock owned (registered) by the user A, and the match results of the team of the player corresponding to the player stock owned (registered) by the user A, are displayed on the terminal 10A of the user A. As illustrated in FIG. 4, when the user A owns the stock of a team T1 and the stock of a player P1 of a team 13, for example, the terminal 10A acquires the match result data 264 about the teams T1 and T3 from the server 20, and displays the match result data 264.

As illustrated in FIG. 4, the terminal 10 acquires data including the dividend points obtained by each match and weekly total dividend points PT_ALL (15,676 points) from the server 20 on a weekly basis, and displays the data on the display section 190. As illustrated in FIG. 4, the value (2,670) of the money M used in the game, and the number K (e.g., 6) of lottery tickets are also displayed.

Figure 5:
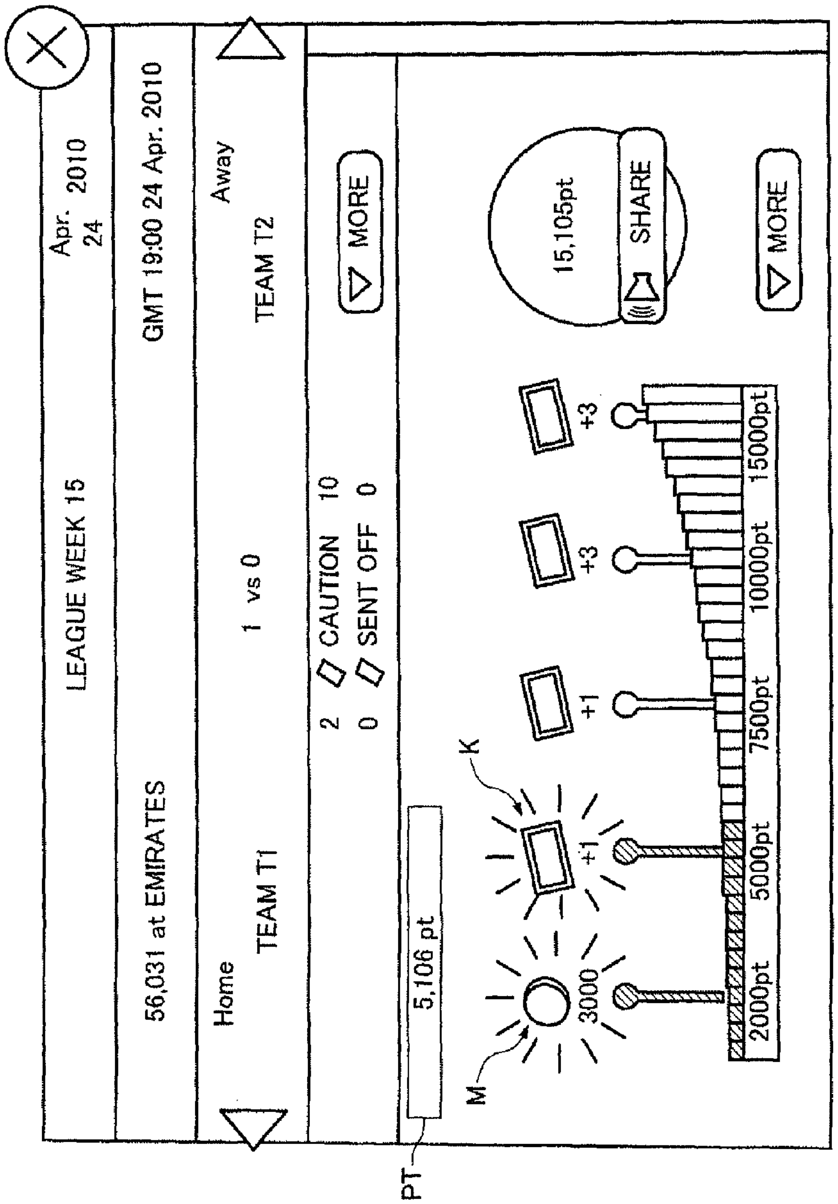
FIG. 5 illustrates an example of data (screen) displayed on a terminal according to one embodiment of the invention.

FIG. 5 illustrates an example of data (image) that indicates the detailed results of one match. As illustrated in FIG. 5, the results of a match between teams T1 and T2 on April 24 are displayed. FIG. 5 illustrates an example in which the user obtained 5,106 dividend points PT, 3000 as the money M (bonus), and one lottery ticket.

3-3. Registration of Team Stock

In one embodiment of the invention, a team stock (i.e., virtual item) is registered based on a registration request from the terminal of the user. Specifically, when the server 20 has received a team stock (e.g., the stock of a team T1) registration request from the terminal 10 of the user, the server 20 registers the team stock so that the team stock is linked to the identification information about the user on condition that the price of the team stock is subtracted from the money M owned by the user. (In short, when the server 20 has received a team stock registration request from the terminal 10 of the user, the server 20 registers the team stock in association with the identification information of the user.) In one embodiment of the invention, the price of the team stock is changed based on the match result data 264 about the team. The price of the team stock is also changed based on trade of the team stock.

3-4. Registration of Virtual Item

In one embodiment of the invention, when the user desires to acquire a player stock (i.e., virtual item), a lottery process is performed on condition that the user uses (consumes) a predetermined number of lottery tickets (a predetermined number is subtracted from the number of lottery tickets), and a stock corresponding to the player chosen by the lottery process is registered as the player stock owned by the user. (In short, the server 20 registers chosen the player stock in association with the identification information of the user.)

3-4-1. Type of Lottery

In one embodiment of the invention, a plurality of lottery processes are provided, and a lottery process selected by the user is performed. For example, (1) a random lottery process (first lottery process), (2) a lottery process based on the birthday of the player (second lottery process), (3) a team lottery process (third lottery process), and (4) a gold lottery process (fourth lottery process) are provided, as illustrated in FIG. 6.

(1) Random Lottery Process

The random lottery process randomly chooses one player from the players of a plurality of teams that belong to a league. The player stock corresponding to the randomly chosen player is registered as the player stock owned by the user so that the player stock is linked to the identification information about the user.

In one embodiment of the invention, the lottery count performed after the user has started the game is counted, and a player is chosen based on the lottery count.

For example, a rarity value (rarity) (0, 1, 2, 3, or 4) is set to each player managed by the server 20. Specifically, a rarity value 0 (common (C)), a rarity value 1 (uncommon (UC)), a rarity value 2 (rare (R)), rarity value 3 (super rare (SR)), or a rarity value 4 (best eleven (B11)) is set to each player managed by the server 20. A player with a high rarity value is a popular player who is expected to take an active part. Specifically, a player with a high rarity value ensures that the user can obtain high dividend points.

FIG. 7 illustrates a rarity table that indicates the relationship between the lottery count and the rarity value. In one embodiment of the invention, the lottery process is performed referring to the rarity table. As illustrated in FIG. 7, when the lottery process is performed for the first time (i.e., the lottery count is 1), one player is randomly chosen from the players with the rarity value 4 referring to a rarity table 1. When the tenth lottery process is performed (i.e., the lottery count is 10), one player is randomly chosen from the players with the rarity value 2.

As illustrated in FIG. 7, when the lottery process has been performed twenty times using the beginner table 1, the subsequent lottery process is performed using a beginner table 2. When the lottery process has been performed twenty times using the beginner table 2, the subsequent lottery process is performed using a normal table. The normal table is then repeatedly used for the lottery process.

This allows a user who has just started the game to acquire a player stock corresponding to a player with a high rarity value.

Note that a correction process may be performed. For example, when a special event has occurred (e.g., when the user has been charged), a service value “3” may be added to the rarity value, and a player may be chosen from the players with the resulting rarity value. The service value may be successively added to the rarity value as the amount charged increases. When the rarity value has become equal to or larger than 5 due to the addition of the service value, the rarity value is corrected to the maximum value (4).

(2) Lottery Process Based on Birthday of Player

The second lottery process is performed based on the birthday of the player. For example, a seven-day period around the birthday of the player is set as a special period of the player. When the user has selected the second lottery process, one player is randomly chosen from the players whose special period includes the day when the second lottery process is performed. The player stock corresponding to the randomly chosen player is registered as the player stock owned by the user.

Therefore, since each player is easily chosen once a year, the user can have a chance to acquire the stock corresponding to a popular player.

(3) Team Lottery Process

The third lottery process allows the user to designate a team among a plurality of teams (or the league), and randomly chooses one player from the players of the designated team. The player stock corresponding to the randomly chosen player is registered as the player stock owned by the user. Therefore, since the player is chosen from the players of the team designated by the user, the user can have a chance to acquire the stock corresponding to the player of his favorite team.

(4) Gold Lottery Process

The fourth lottery process randomly chooses one player from the players with a rarity value equal to or higher than 3. The player stock corresponding to the randomly chosen player is registered as the player stock owned by the user. Therefore, the user can obtain the player stock corresponding to the player who is expected to take an active part.

3-4-2. Selection of Lottery (Type)

Figure 8:
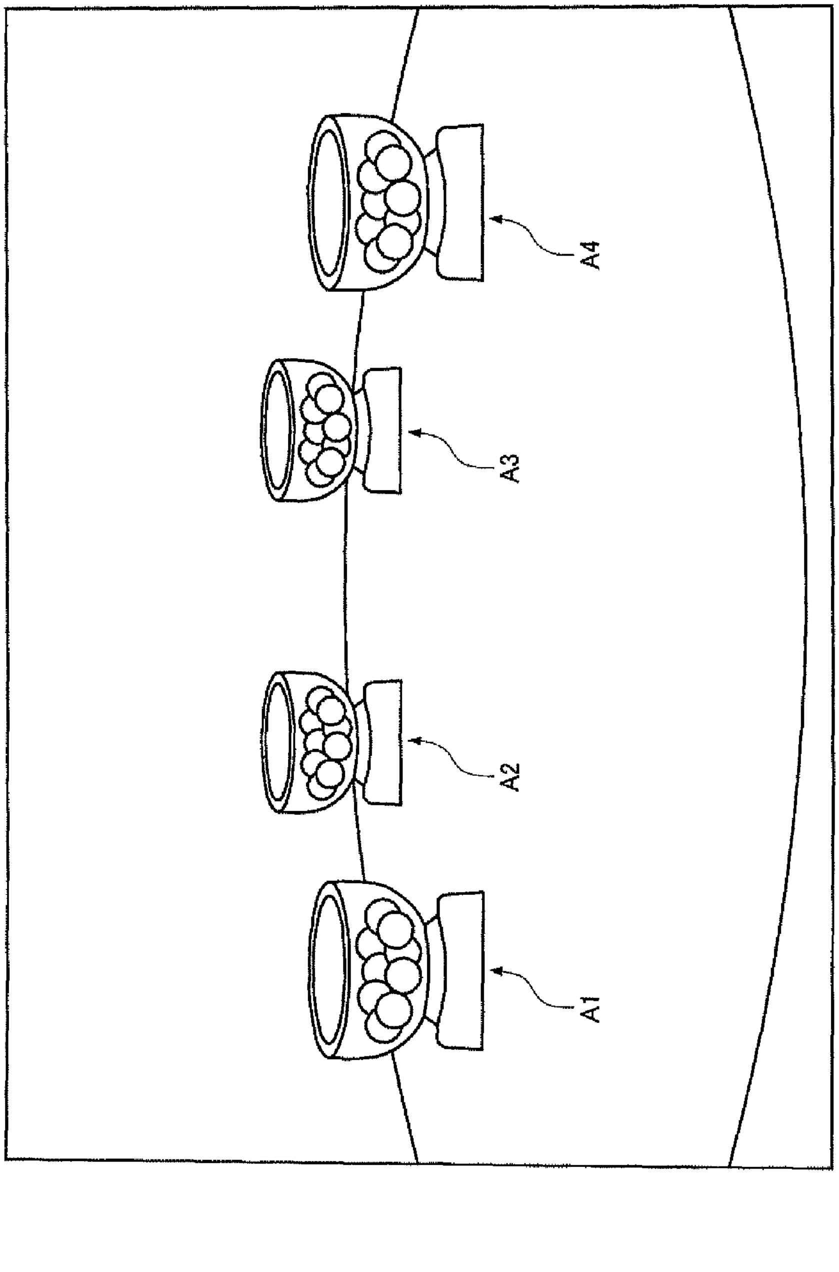
FIG. 8 illustrates an example of data (screen) displayed on a terminal according to one embodiment of the invention.

The server 20 receives a request that selects one of the plurality of lottery processes from the terminal of the user, and chooses a player by the lottery process selected by the user. For example, an image in which pods A1 to A4 (see FIG. 8) are drawn corresponding to the lottery processes is displayed. For example, the server 20 performs the random lottery process (first lottery process) corresponding to the pod A1 when the server 20 has received a request that selects the pod A1, performs the lottery process based on the birthday of the player (second lottery process) corresponding to the pod A2 when the server 20 has received a request that selects the pod A2, performs the team lottery process (third lottery process) corresponding to the pod A3 when the server 20 has received a request that selects the pod A3, and performs the gold lottery process (fourth lottery process) corresponding to the pod A4 when the server 20 has received a request that selects the pod A4.

The server 20 may determine whether or not a level LV (see FIG. 6) of the user has reached a level required for each lottery process, and may perform the selected lottery process when the level LV of the user has reached a level required for the selected lottery process. For example, when the gold lottery process has been selected, the server 20 determines whether or not the level LV of the user is equal to or larger than 20. The server 20 performs the gold lottery process when the level LV of the user is equal to or larger than 20. The server 20 does not perform the gold lottery process (does not accept the request) when the level LV of the user is not equal to or larger than 20. Note that the level LV of the user is increased based on the game play time and the game play count.

The server 20 may determine whether or not the number of lottery tickets possessed by the user has reached a number required for each lottery process (see FIG. 6), and may perform the selected lottery process when the number of lottery tickets possessed by the user has reached a number required for the selected lottery process. For example, when the gold lottery process has been selected, the server 20 determines whether or not the number of lottery tickets possessed by the user is equal to or larger than 10. The server 20 performs the gold lottery process when the number of lottery tickets possessed by the user is equal to or larger than 10. The server 20 does not perform the gold lottery process (does not accept the request) when the number of lottery tickets possessed by the user is not equal to or larger than 10.

Specifically, the server 20 determines whether or not the selected lottery process can be performed based on at least one of the level of the user and the number of lottery tickets possessed by the user, performs the lottery process selected by the user when it has been determined that the selected lottery process can be performed, and does not perform the lottery process selected by the user when it has been determined that the selected lottery process cannot be performed.

Note that the number of lottery tickets required for the selected lottery process is subtracted from the number of lottery tickets possessed by the user when the selected lottery process has been performed. For example, when the gold lottery process has been performed, "10" is subtracted from the number of lottery tickets possessed by the user.

3-5. Process that Notifies Another User that Virtual Item has been Registered

In one embodiment of the invention, when the virtual item (e.g., player stock) chosen by the lottery process has been registered as the virtual item owned by the user (the virtual item of the user), another user is notified that the virtual item owned by the user has been registered.

Figure 9:
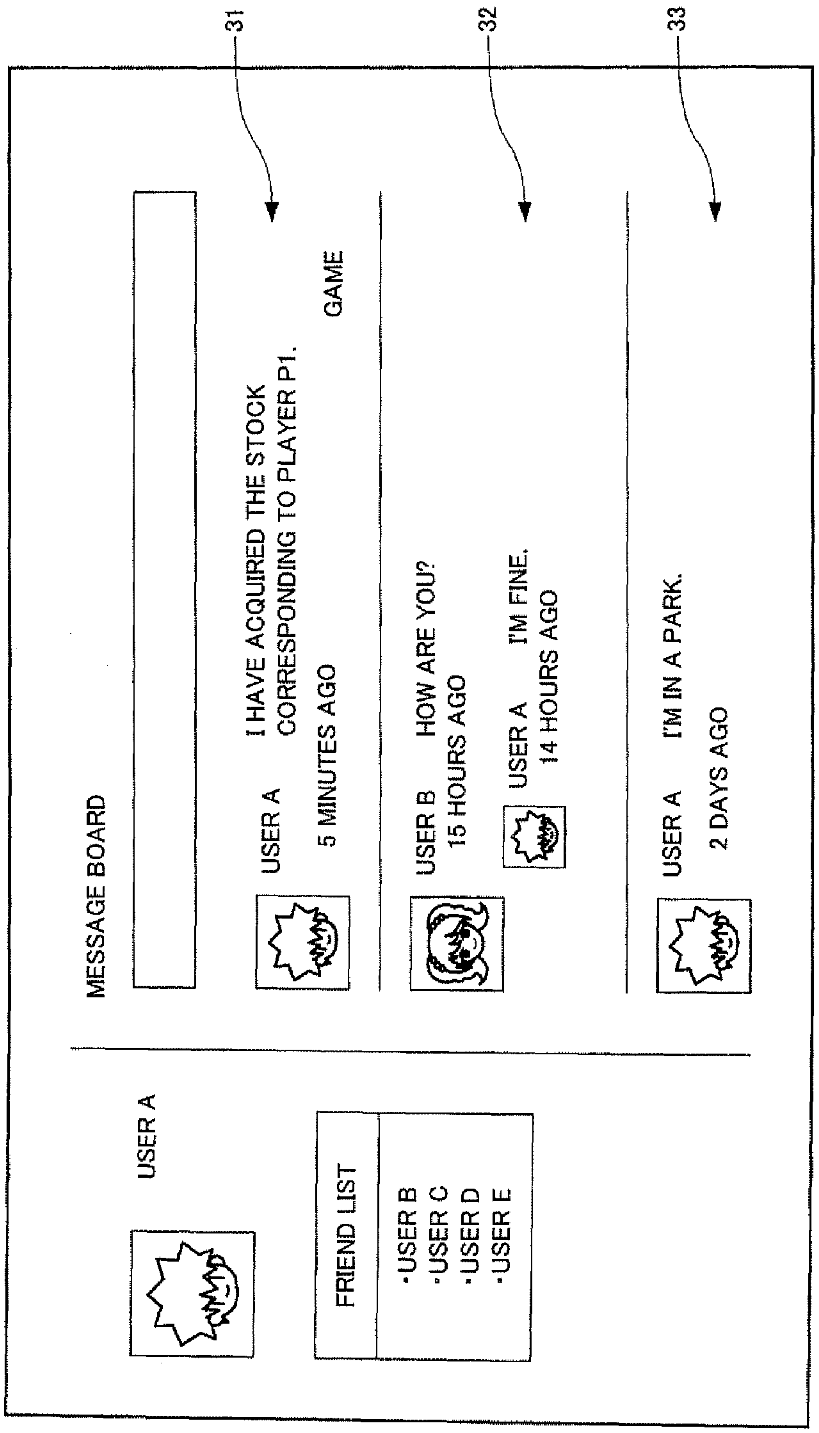
FIG. 9 illustrates an example of data (screen) displayed on a terminal A according to one embodiment of the invention.

As illustrated in FIG. 9, when a user A has acquired the stock corresponding to a player P1 by the lottery process, information 31 that indicates that the user A has acquired the stock corresponding to the player P1 is displayed on the web page of the user A as the notice information.

Figure 10:
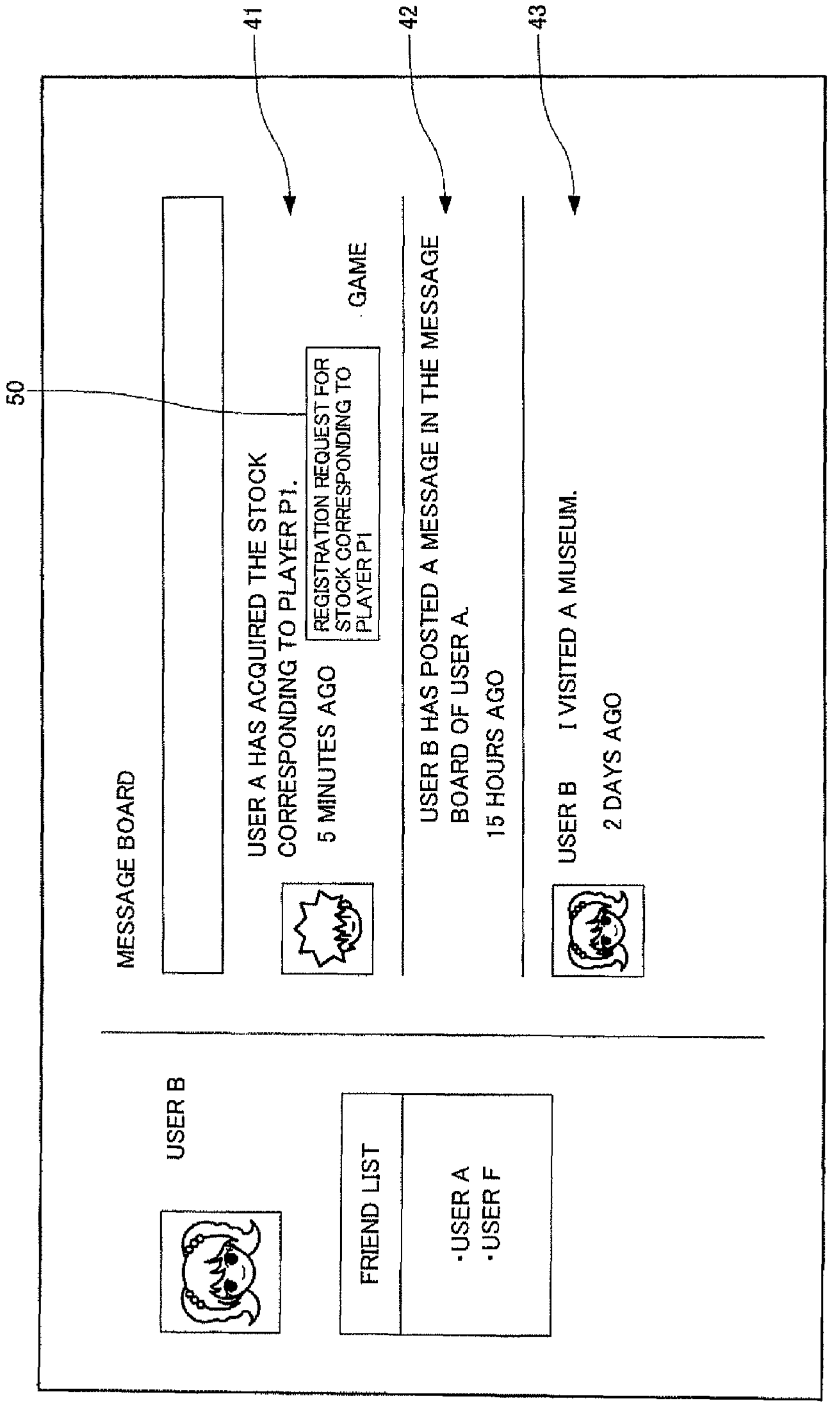
FIG. 10 illustrates an example of data (screen) displayed on a terminal B according to one embodiment of the invention.

As illustrated in FIG. 10, information that indicates that the user A has acquired the stock corresponding to the player P1 is also displayed in the web page of a user B who is registered as a friend of the user A as the notice information.

Specifically, the server 20 notifies another user of the game status such as the registered virtual item (e.g., player stock), the game progress, and the level. Note that the server 20 limits information disclosed to another user based on the viewing restriction information about each user. An example in which the user A allows only his friends to view the game status is described below.

In this case, when the server 20 has been accessed from users B, C, D, and E registered in the friend list of the user A, the server 20 allows the users B, C, D, and E to view information that indicates that the user A has acquired the stock corresponding to the player P1 using the terminal. Specifically, when the users A and B maintain a friend relationship, and the user A allows his friends to view the game status, information 41 that indicates that the user A has acquired the stock corresponding to the player P1 is displayed (shared) on the web page of the user B, as illustrated in FIG. 10. Specifically, the user B can view the information that indicates that the user A has acquired the stock corresponding to the player P1 using his terminal. The user B can post a message (comments) (e.g., "Great!") about the virtual item acquired by the user A.

The server 20 transmits the information 41 about registration of the virtual item by the user using the HTTP protocol based on access from the terminal of another user. Note that the server 20 may transmit the information 31 about registration of the virtual item by the user by an e-mail delivery process using the SMTP protocol.

3-6. Registration of Virtual Item (2)

In one embodiment of the invention, when a registration request for the virtual item (virtual item chosen by the lottery process) owned by the user has been received from the terminal of another user, the virtual item owned by the user is registered as the virtual item owned by the other user so that the virtual item is linked to the identification information about the other user. (In short, when the registration request has been received, the server 20 registers the virtual item of the user in association with the identification information of the other user as a virtual item of the other user.)

For example, when the user B has been notified that the user A has acquired the stock corresponding to the player P1 from the notice information, the user B transmits a registration request for the stock corresponding to the player P1 to the server 20 using his terminal. As illustrated in FIG. 10, the user B can transmit a registration request for the stock corresponding to the player P1 by clicking on a registration request link 50 ("Registration request for stock corresponding to player P1"), for example. In other words, the terminal of the user B transmits a registration request for the stock corresponding to the player P1 to the server 20 based on the information input by the user B. When the server 20 has received the registration request from the terminal of the user B, the server 20 registers the stock corresponding to the player P1 as the player stock owned by the user B so that the stock is linked to the identification information about the user B.

This makes it possible for the user B to acquire (register) the stock corresponding to the player P1 even if the user B cannot acquire the stock corresponding to the player P1 by the lottery process. Specifically, the user B can acquire (register) the stock corresponding to the player P1 just like the user A.

For example, when the player P1 is most active among a plurality of players P1 to P100, it is considered that many users desire to acquire (register) the stock corresponding to the player P1. If the user can acquire the stock corresponding to the player P1 by only the lottery process that randomly chooses a player, the user may be discontented. According to the above configuration, however, since the user has a chance to acquire the stock corresponding to the player P1 by a means other than the lottery process, the user can enjoy the game more.

Note that the user may be allowed to select whether or not to allow another user to register the virtual item registered by the lottery process. For example, when the user A has registered the stock corresponding to the player P1, the server 20 receives information that indicates whether or not to allow another user to register the stock corresponding to the player P1 from the terminal 10A of the user A. When the user A allows another user to register the stock corresponding to the player P1, the server 20 registers the stock corresponding to the player P1 as the player stock owned by another user when the server 20 has received a registration request for the stock corresponding to the player P1 from the terminal of the other user. When the user A allows another user to register the stock corresponding to the player P1, the server 20 may notify another user that the user A has acquired (registered) the player stock (another user). This allows the user to select whether or not to allow another user to register the virtual item registered by the lottery process (i.e., a game that takes account of the intention of the user can be provided).

3-6-1. Temporal Restriction

In one embodiment of the invention, when a registration request for the virtual item (virtual item chosen by the lottery process) owned by the user has been received from the terminal of another user within a predetermined period (e.g., 24 hours) after the virtual item has been registered, the virtual item owned by the user is registered as the virtual item owned by the other user.

Figure 11:
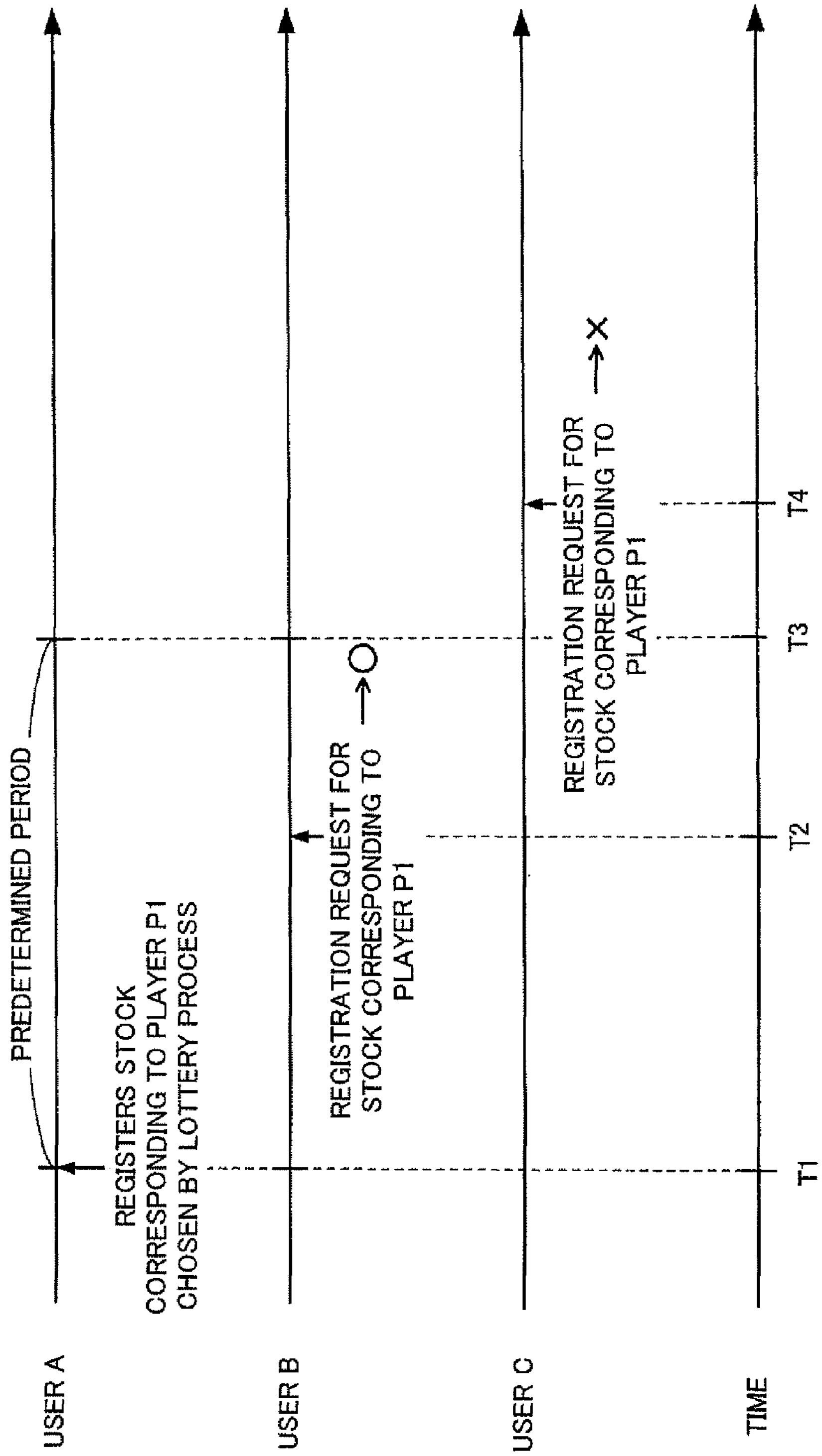
FIG. 11 is a diagram illustrating registration of a virtual item according to one embodiment of the invention.

As illustrated in FIG. 11, the player P1 is chosen by the lottery process at a time T1, and the stock corresponding to the player P1 is registered as the player stock owned by the user A, for example. When a registration request for the stock corresponding to the player P1 has been received from the user B within a predetermined period from the time T1 (e.g., when a registration request for the stock corresponding to the player P1 has been received from the user B at a time T2 within the predetermined period), the stock corresponding to the player P1 is registered as the virtual item owned by the user B. When a registration request for the stock corresponding to the player P1 has been received from the user C after the predetermined period has elapsed from the time T1 (e.g., when a registration request for the stock corresponding to the player P1 has been received from the user C at a time T4 after the predetermined period has elapsed), the stock corresponding to the player P1 is not registered as the virtual item owned by the user C.

A decrease in the value (price) of the stock corresponding to the player P1 can be prevented by thus limiting a period in which another user can acquire (register) the stock corresponding to the player P1. It is also possible to motivate another user to immediately send a registration request for the stock corresponding to the player P1.

3-6-2. Restriction on Number of Users

In one embodiment of the invention, the number of other users for whom the virtual item (virtual item chosen by the lottery process) owned by the user is registered as the virtual item of the other user is limited to a predetermined number.

For example, the number of other users for whom the player stock (stock corresponding to the player P1) chosen by the lottery process for the user A can be registered is limited to "3". Specifically, three users can acquire (register) the stock corresponding to the player P1 in order of arrival of the registration request. For example, when a registration request for the stock corresponding to the player P1 has been received from the users B, C, D, and E in this order within a predetermined period, the users B, C, and D can acquire (register) the stock corresponding to the player P1 as the player stock owned by each user. Specifically, the initial value of the number of stock-coregistered users is set to zero, and is incremented by one each time the stock corresponding to the player P1 is registered as the player stock owned by another user (B, C, and D). When the number of stock-coregistered users has reached a predetermined number (e.g., "3"), and a registration request for the stock corresponding to the player P1 has been received from the user E, the stock corresponding to the player P1 is not registered as the player stock owned by the user E. Note that the server 20 may not display the registration request link 50 (see FIG. 10) on the terminal when the number of stock-coregistered users has reached a predetermined number. Specifically, the server 20 may perform a control process so that the terminal cannot transmit a registration request for the stock corresponding to the player P1 to the server 20 based on information input by another user when the number of stock-coregistered users has reached a predetermined number.

A decrease in the value (price) of the stock corresponding to the player P1 can be prevented by thus limiting the number of users for whom the stock corresponding to the player P1 can be registered to a predetermined number (e.g., "3"). It is also possible to motivate another user to immediately send a registration request for the stock corresponding to the player P1.

Note that the number of other users for whom the stock corresponding to the player P1 chosen by the lottery process for the user A may be set based on input information from the terminal 10 of the user A, for example.

Specifically, when the server 20 has registered the stock corresponding to the player P1 chosen by the lottery process so that the stock is linked to the identification information about the user A, the server 20 receives the number of users (i.e., predetermined number) for whom the stock corresponding to the player P1 can be registered from the terminal 10A of the user A. When the server 20 has received the number of users for whom the stock corresponding to the player P1 can be registered from the terminal 10A, the server 20 limits the number of other users for whom the stock corresponding to the player P1 is registered as the player stock to the received number. Note that the received number is stored in the storage section 270 of the server 20.

For example, when the number of users for whom the stock corresponding to the player P1 can be registered received from the terminal 10A of the user A is "2", the stock corresponding to the player P1 (chosen by the lottery process) can be registered as the player stock of up to two users.

This allows the user (e.g., user A) to limit the number of other users for whom the virtual item acquired by the lottery process is registered (i.e., a game that takes account of the intention of the user can be provided).

The server 20 may set the number of users for whom the virtual item acquired by the lottery process can be registered based on the number of friends of the user. For example, the server 20 may refer to the friend information that is stored in the storage section and specifies another user who maintains a friend relationship with the user A, and may set the number of users for whom the virtual item acquired by the user A as a result of the lottery process can be registered based on the number of friends of the user A.

Specifically, when the users B to E are friend users of the user A, the number of friends of the user A is "4". In this case, the number of users for whom the virtual item acquired by the user A as a result of the lottery process can be registered is set to "2" (i.e., half of the number of friends of the user A), for example. Specifically, the server 20 limits the number of other users for whom the stock corresponding to the player P1 can be registered to "2". Specifically, the stock corresponding to the player P1 (chosen by the lottery process for the user A) can be registered as the player stock of up to two other users. This makes it possible to appropriately limit the number of other users for whom the stock corresponding to the player P1 can be registered.

Note that the server 20 may perform only one of the process that limits a period in which the virtual item owned by the user can be registered as the virtual item of another user, and the process that limits the number of other users for whom the virtual item owned by the user is registered as the virtual item.

3-6-3. Determination as to Whether or not to Register Virtual Item Based on Friend Relationship In one embodiment of the invention, whether or not to register the virtual item owned by the user chosen by the lottery process as the virtual item of another user may be determined based on the friend relationship.

Specifically, when a registration request for the virtual item owned by the user has been received from the terminal of another user who maintains a friend relationship with the user, the virtual item owned by the user may be registered as the virtual item owned by the other user. In other words, when a registration request for the virtual item owned by the user has been received from the terminal of another user who does not maintain a friend relationship with the user, the virtual item owned by the user is not registered as the virtual item owned by the other user.

For example, when the users A and B maintain a friend relationship, it is determined that the stock corresponding to the player P1 chosen by the lottery process and registered as the player stock of the user A can be registered as the player stock owned by the user B. When the users A and F do not maintain a friend relationship, it is determined that the stock corresponding to the player P1 chosen by the lottery process and registered as the player stock of the user A cannot be registered as the player stock owned by the user F.

This makes it possible for users to maintain a close friend relationship. If the user and another user do not maintain a friend relationship, it is possible to motivate the user and the other user to establish a friend relationship. Since the possibility that the user can acquire a rare virtual item increases as the number of friends increases, it is possible to motivate the user make new friends.

3-6-4. Relationship Between Registration of Virtual Item and Game Parameter

In one embodiment of the invention, when a registration request for the virtual item (virtual item chosen by the lottery process) owned by the user has been received from the terminal of another user, the virtual item owned by the user may be registered as the virtual item owned by the other user so that the virtual item is linked to the identification information about the other user on condition that a value corresponding to the virtual item is subtracted from the game parameter of the other user. Specifically, when registering the virtual item of a first user (e.g., user A) as the virtual item of a second user (e.g., user B) without performing the lottery process, the virtual item of the first user may be registered as the virtual item of the second user so that the virtual item is linked to the identification information about the second user on condition that a value corresponding to the virtual item is subtracted from the money M (i.e., game parameter) of the second user.

For example, when the player P1 has been chosen by the lottery process based on a lottery request from the terminal of the user A, the stock corresponding to the player P1 has been registered as the player stock of the user A, and the server 20 has received a registration request for the stock corresponding to the player P1 from the terminal 10B of the user B, the server 20 determines whether or not the amount of money M owned by the user B is equal to or more than the price (e.g., 1000) of the stock corresponding to the player P1. When the amount of money M owned by the user B is equal to or more than the price (e.g., 1000) of the stock corresponding to the player P1, the server 20 registers the stock corresponding to the player P1 as the player stock owned by the user B, and subtracts the price (e.g., 1000) of the stock corresponding to the player P1 from the money M owned by the user B.

Since the price of the stock corresponding to the player P1 is subtracted from the money M owned by another user (user B), the other user may lose money. However, the amount of money M owned by the other user (user B) may increase when the player P1 has played an active part. This makes it possible to provide a more interesting game.

3-7. Flowchart

Figure 12:
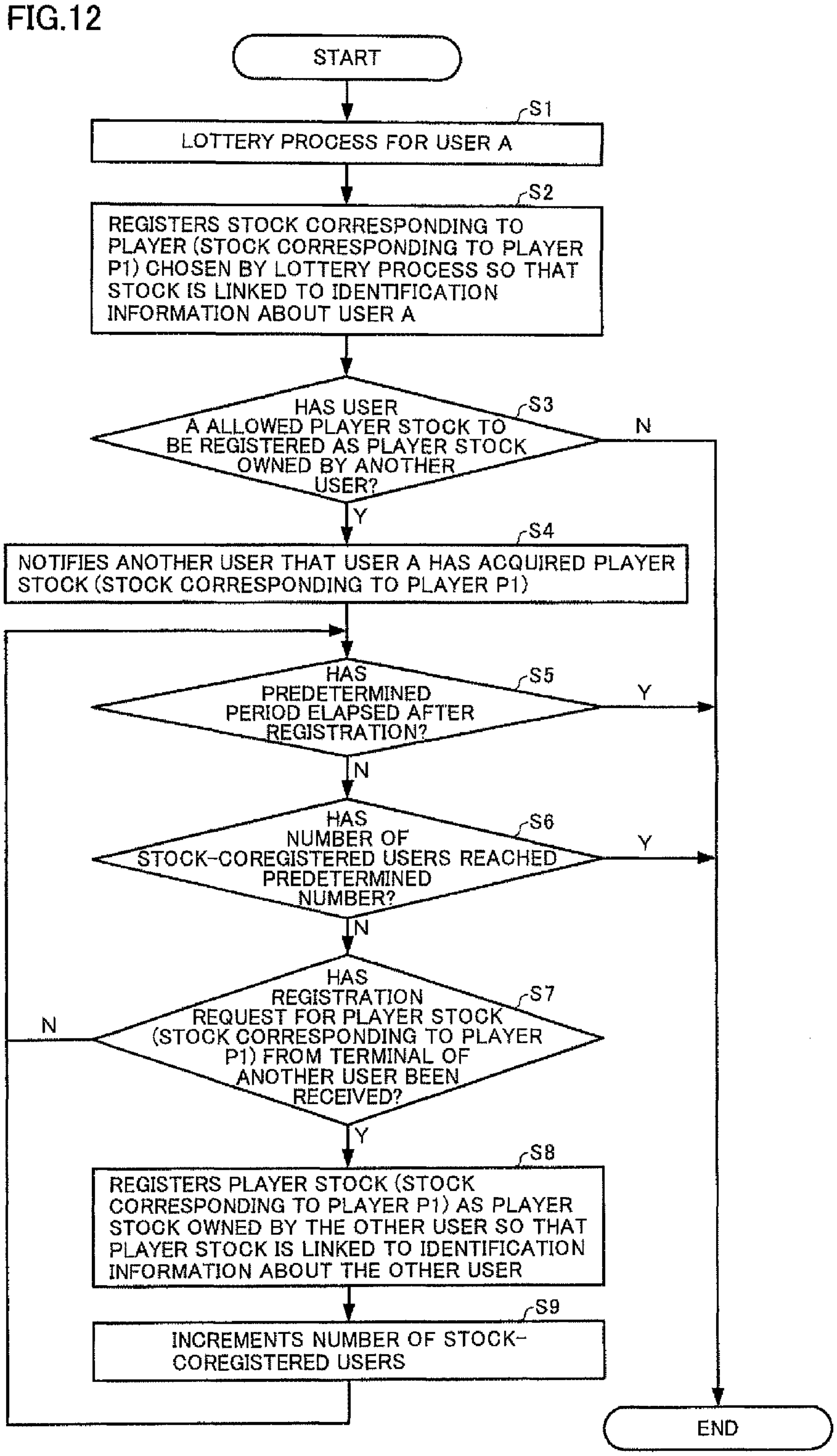
FIG. 12 is a flowchart according to one embodiment of the invention.

The flow of the player stock (virtual item) registration process according to one embodiment of the invention is described below with reference to FIG. 12. The lottery process for the user A is performed (step S1). The stock corresponding to the player (stock corresponding to the player P1) chosen by the lottery process is registered so that the stock is linked to the identification information about the user A (step S2).

Whether or not the user A has allowed the player stock owned by the user A to be registered as the player stock owned by another user is then determined (step S3). For example, information about whether or not the user A has allowed the player stock owned by the user A to be registered as the player stock owned by another user is received from the terminal of the user A, and whether or not the user A has allowed the player stock owned by the user A to be registered as the player stock owned by another user is determined based on the received information.

When the user A has allowed the player stock owned by the user A to be registered as the player stock owned by another user (Y in step S3), another user is notified that the user A has acquired (registered) the player stock (stock corresponding to the player P1) (step S4). Note that the number of stock-coregistered users is set to the initial value (e.g., "0"). When the user A has not allowed the player stock owned by the user A to be registered as the player stock owned by another user (N in step S3), the process ends.

Whether or not a predetermined period has elapsed after registration (i.e., the time when the stock corresponding to the player P1 has been registered as the player stock owned by the user A) is then determined (step S5). When the predetermined period has elapsed after registration (Y in step S5), the process ends.

When the predetermined period has not elapsed after registration (N in step S5), whether or not the number of stock-coregistered users has reached a predetermined number is determined (step S6). When the number of stock-coregistered users has reached the predetermined number (Y in step S6), the process ends.

When the number of stock-coregistered users has not reached the predetermined number (N in step S6), whether or not a registration request for the player stock (stock corresponding to the player P1) has been received from the terminal of another user is determined (step S7). When a registration request for the player stock (stock corresponding to the player P1) has not been received from the terminal of another user (N in step S7), the step S5 is performed again.

When a registration request for the player stock (stock corresponding to the player P1) has been received from the terminal of another user (Y in step S7), the player stock (stock corresponding to the player P1) is registered as the player stock owned by the other user so that the player stock is linked to the identification information about the other user (step S8). The number of stock-coregistered users is then incremented (step S9). After completion of the step S9, the step S5 is performed again.

4. Application Example

The embodiments of the invention may be applied to various games instead of the above soccer stock investment game. Specifically, the embodiments of the invention may be applied to another game that provides a virtual item using a lottery process. For example, a game that registers a virtual item chosen by a lottery process as the virtual item owned by the user may be implemented so that the virtual item owned by the user can be registered as the virtual item of another user.

Although an example in which a player stock (player) is randomly chosen from a plurality of player stocks (a plurality of players) has been described above, a team stock may also be randomly chosen by the lottery process. In this case, the team stock owned by the user that has been chosen by the lottery process may also be registered as the team stock owned by another user.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A system that provides a game over a social networking service and that is configured to determine whether or not to offer registration of a virtual item to a friend based on friendship information of the social networking service, the system comprising:

a server comprising:

a memory; and a processor configured to:

communicate with a plurality of terminals that are configured to exchange data with the server via a network, when a lottery registration request is received from a terminal of a first user of one of the plurality of terminals:

(1) randomly choose, by a lottery processing, a virtual item from a plurality of virtual items stored in the memory of the server;

(2) register the chosen virtual item in association with identification information of the first user as a virtual item of the first user;

(3) determine, based on stored friend information, a second user of one of the plurality of terminals who maintains a friend relationship with the first user and that receives notifications related to the first user;

(4) provide a webpage or display screen at the terminal of the second user who maintains the friend relationship with the first user, the webpage or display screen both: (a) notifying the second user who maintains the friend relationships with the first user that the chosen virtual item has been registered by the first user; and (b) providing a clickable link or clickable displayed information that, when clicked, causes a registration request for the virtual item to be transmitted from the terminal of the second user who maintains the friend relationship with the first user to the server, wherein the webpage or display screen is unique to the second user, and includes a message board with messages for the second user from users other than the second user that are different than messages on a message board of the first user; and (5) when the registration request for the chosen virtual item is received from the terminal of the second user who maintains the friend relationship with the first user register the virtual item of the first user also as a virtual item of the second user who maintains the friend relationship with the first user, while maintaining the registration of the virtual item of the first user in association with the identification information of the first user, whereby the second user, who is a friend of the first user, may acquire the virtual item that was not necessarily acquirable via the lottery processing based on the registration via the lottery processing of the first user; and perform game calculations based on the virtual item in association with identification information of each user that has registered the virtual item, a value of the virtual item being changed based on result information of the game calculations.

2. The system as defined in claim 1, wherein the processor is further configured such that registration of the virtual item of the first user as the virtual item of the second user occurs, when the registration request for the virtual item of the first user from the terminal of the second user has been received within a predetermined period after the virtual item of the first user has been registered.

3. The system as defined in claim 1, wherein the processor is further configured to: limit a number of users for whom the virtual item of the first user is registered to a predetermined number.

4. The system as defined in claim 1, wherein the processor is further configured to receive a user selection of the lottery processing by the first user, and the lottery processing is a lottery processing that corresponds to the first user's selection.

5. The system as defined in claim 1, wherein each of the plurality of virtual items are stored in association with one of a plurality of rarity values; and the randomly choosing the virtual item includes selecting one of the plurality of rarity values based on a lottery count of the first user, and selecting the virtual item from the stored plurality of virtual items that have the selected rarity value.

6. The system as defined in claim 1, wherein the processor is further configured to: when the lottery registration request from the terminal of the first user has been received, associate each of the plurality of virtual items with one group of a plurality of groups; and the randomly choosing, via the lottery processing, the virtual item includes selecting a virtual item from the plurality of virtual items of the one group that has been determined in advance based on information input by the first user.

7. The system as defined in claim 1, wherein the choosing the virtual item includes:

receiving a selection of one lottery process among a plurality of lottery processes that differ from each other in virtual item choosing methods from the terminal of the first user, and choosing the virtual item from the stored plurality of virtual items by the lottery process of the received selection.

8. The system as defined in claim 1, wherein each of the plurality of virtual items is a virtual player item corresponding to an existing player; and at least one of the game calculations calculates a game parameter of the first user based on actual match result information about the existing player corresponding to the virtual player item registered for the first user.

9. The system as defined in claim 8, wherein at least one of the game calculations changes the value of the virtual player item based on the actual match result information about the existing player.

10. The system of claim 1, wherein the clickable link or clickable displayed information is a registration request box.

11. The system of claim 1, wherein the second user is listed in a friends listing of the first user.

12. A server that provides a game over a social networking service and that is configured to determine whether or not to offer registration of a virtual item to a friend based on friendship information of the social networking service, the server comprising:

a memory; and a processor configured to:

communicate with a plurality of terminals that are configured to exchange data with the server via a network;

when a lottery registration request is received from a terminal of a first user of one of the plurality of terminals:

randomly choose, by a lottery processing, a virtual item from a plurality of virtual items stored in the memory;

register the chosen virtual item in association with identification information of the first user as a virtual item of the first user;

determine, based on stored friend information, a second user of one of the plurality of terminals who maintains a friend relationship with the first user and that receives notifications related to the first user;

provide a webpage or display screen at the terminal of the second user who maintains the friend relationship with the first user, the webpage or display screen both:

(a) notifying the second user who maintains the friend relationships with the first user that the chosen virtual item has been registered by the first user; and (b) providing a clickable link or clickable displayed information that, when clicked, causes a registration request for the virtual item to be transmitted from the terminal of the second user who maintains the friend relationship with the first user to the server, wherein the webpage or display screen is unique to the second user, and includes a message board with messages for the second user from users other than the second user that are different than messages on a message board of the first user; and when the registration request for the chosen virtual item is received at the server from the terminal of the second user who maintains the friend relationship with the first user, register the virtual item of the first user also as a virtual item of the second user, while maintaining the registration of the virtual item of the first user in association with the identification information of the first user, whereby the second user who is a friend of the first user, may acquire the virtual item that was not necessarily acquirable via the lottery processing based on the registration via the lottery processing of the first user; and perform game calculations based on the virtual item in association with identification information of each user, a value of the virtual item being changed based on result information of the game calculations.

13. A server-implemented method that provides a game over a social networking service and that is configured to determine whether or not to offer registration of a virtual item to a friend based on friendship information of the social networking service, the method comprising:

communicating, by a processor of a server, with a plurality of terminals that are configured to exchange data with the server via a network;

when a lottery registration request is received by the processor of the server from a terminal of a first user of one of the plurality of terminals:

randomly choosing, by the processor of the server, based on a lottery processing, a virtual item from a plurality of virtual items stored in a memory of the server;

registering, by the processor, the chosen virtual item in association with identification information of the first user as a virtual item of the first user;

determining, by the processor, based on stored friend information, a second user of one of the plurality of terminals who maintains a friend relationship with the first user and that receives notifications related to the first user;

providing, by the server, a webpage or display screen at the terminal of the second user who maintains the friend relationship with the first user, the webpage or display screen both:

(a) notifying the second user who maintains the friend relationship with the first user that the chosen virtual item has been registered by the first user; and (b) providing a clickable link or clickable displayed information that, when clicked, cause a registration request for the virtual item to be transmitted from the terminal of the second user who maintains the friend relationship with the first user to the processor of the server, wherein the webpage or display screen is unique to the second user, and includes a message board with messages for the second user from users other than the second user that are different than messages on a message board of the first user; and when the registration request for the chosen virtual item is received from the terminal of the second user who maintains the friend relationship with the first user, registering, by the processor, the virtual item of the first user also as a virtual item of the second user who maintains the friend relationship with the first user, while maintaining the registration of the virtual item of the first user in association with the identification information of the first user, whereby the second user, who is a friend of the first user, may acquire the virtual item that was not necessarily acquirable via the lottery processing based on the registration via the lottery processing of the first user; and performing, by the processor, game calculations based on the virtual item in association with identification information of each user that has registered the virtual item, a value of the virtual item being changed based on result information of the game calculations.

14. A non-transitory computer-readable information storage medium storing a server program that provides a game over a social networking service and that is configured to determine whether or not to offer registration of a virtual item to a friend based on friendship information of the social networking service, the server program comprising instructions that, when executed, cause a processor of a server to:

communicate with a plurality of terminals that are configured to exchange data with the server via a network;

when a lottery registration request is received from a terminal of a first user of one of the plurality of terminals:

(1) randomly choose, by a lottery processing, a virtual item from a plurality of virtual items stored in a memory of the server;

(2) register the chosen virtual item in association with identification information of the first user as a virtual item of the first user;

(3) determine, based on stored friend information, a second user of one of the plurality of terminals who maintains a friend relationship with the first user and that receives notifications related to the first user;

(4) provide a webpage or display screen at the terminal of the second user who maintains the friend relationship with the first user, the webpage or display screen both: (a) notifying the second user who maintains the friend relationship with the first user that the chosen virtual item has been registered by the first user; and (b) providing a clickable link or clickable displayed information that, when clicked, causes a registration request for the virtual item to be transmitted from the terminal of the second user who maintains the friend relationship with the first user to the server, wherein the webpage or display screen is unique to the second user, and includes a message board with messages for the second user from users other than the second user that are different than messages on a message board of the first user; and (5) when the registration request for the chosen virtual item is received from the terminal of the second user who maintains the friend relationship with the first user, register the virtual item of the first user also as a virtual item of the second user who maintains the friend relationship, while maintaining the registration of the virtual item of the first user in association with the identification information of the first user, whereby the second user, who is a friend of the first user, may acquire the virtual item that was not necessarily acquirable via the lottery processing based on the registration via the lottery processing of the first user; and perform game calculations based on the virtual item in association with identification information of each user that has registered the virtual item, a value of the virtual item being changed based on result information of the game calculations.

15. The non-transitory computer-readable information storage medium of claim 14, wherein the notifying the second user who maintains the friend relationship with the first user that the virtual item has been registered includes displaying, on the webpage or display screen of the terminal of the second user who maintains the friend relationship with the first user, both an indication that the virtual item has been registered, and a clickable registration request box allowing registration of the virtual item.

16. The non-transitory computer-readable information storage medium of claim 14, wherein the second user is listed in a stored friends listing of the first user.

17. The non-transitory computer-readable information storage medium of claim 14, wherein the second user is one of a plurality of users in a specified group relating to the first user.

* * * * *